US011804175B2

(12) United States Patent
Cho et al.

(10) Patent No.: US 11,804,175 B2
(45) Date of Patent: Oct. 31, 2023

(54) ELECTRONIC DEVICE THAT COMPENSATES FOR LIGHT PASSING THROUGH A DISPLAY, AND DRIVING METHOD FOR THE SAME

(71) Applicant: Samsung Display Co., LTD., Yongin-si (KR)

(72) Inventors: Jaebum Cho, Seoul (KR); Daewook Kim, Hwaseong-si (KR); Seungin Baek, Seongnam-si (KR); Jewon Yoo, Seoul (KR); Sang-Gu Lee, Yongin-si (KR); Hyung Uk Cho, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 17/588,034

(22) Filed: Jan. 28, 2022

(65) Prior Publication Data
US 2022/0383807 A1    Dec. 1, 2022

(30) Foreign Application Priority Data
May 27, 2021    (KR) .......................... 10-2021-0068447

(51) Int. Cl.
G09G 3/3225    (2016.01)
G09G 3/34      (2006.01)
H04N 23/00     (2023.01)

(52) U.S. Cl.
CPC ......... *G09G 3/3225* (2013.01); *G09G 3/3406* (2013.01); *H04N 23/00* (2023.01)

(58) Field of Classification Search
None
See application file for complete search history.

(56) References Cited

U.S. PATENT DOCUMENTS 9,100,563 B2    8/2015    Choi et al.
9,842,549 B2   12/2017    Musgrave et al.
(Continued)

FOREIGN PATENT DOCUMENTS

CN    112925141 A  *  6/2021
EP    3611656 A1   *  2/2020
(Continued)

OTHER PUBLICATIONS

Harmeling et al., Space-Variant Single-Image Blind Deconvolution for Removing Camera Shake, 2010, Advances in Neural Information Processing Systems 23: 24th Annual Conference on Neural Information Processing Systems 2010, pp. 1-9 (Year: 2010).*
Yuqian Zhou et al., Image Restoration for Under-Display Camera, University of Illinois at Urbana-Champaign, University of California, Berkeley, Microsoft Corporation, arXiV:2003.04857v1[sc.CV] Mar. 10, 2020 (Year: 2020).*
(Continued)

*Primary Examiner* — Kirk W Hermann
(74) *Attorney, Agent, or Firm* — Lewis Roca Rothgerber Christie LLP

(57) ABSTRACT

A method for driving an electronic device may include receiving light passing through a display panel, generating an image signal based on the light, compensating the image signal with a compensation algorithm to generate a compensated image signal, wherein the compensation algorithm is trained with training data including a first comparison image and a second comparison image, and displaying, on the display panel, a compensated image based on the compensated image signal, wherein the first comparison image is a target restoration image and the second comparison image is a composite image.

20 Claims, 27 Drawing Sheets

(56) References Cited

U.S. PATENT DOCUMENTS

| | | | |
|---|---|---|---|
| 10,529,057 B2 | 1/2020 | Hayasaka et al. | |
| 11,100,622 B2 | 8/2021 | Hamada et al. | |
| 2011/0221888 A1* | 9/2011 | Choi | G06T 5/003 |
| | | | 348/E5.025 |
| 2016/0093029 A1* | 3/2016 | Micovic | G06T 1/20 |
| | | | 348/229.1 |
| 2017/0116932 A1* | 4/2017 | Musgrave | G09G 3/36 |
| 2018/0253869 A1* | 9/2018 | Yumer | G06N 3/0454 |
| 2019/0213719 A1* | 7/2019 | Hiasa | G06T 5/50 |
| 2019/0340462 A1* | 11/2019 | Pao | G06T 3/4053 |
| 2021/0012462 A1* | 1/2021 | Kim | G06T 5/001 |
| 2021/0152735 A1* | 5/2021 | Zhou | G06T 5/50 |
| 2021/0365729 A1* | 11/2021 | Hu | G06V 20/46 |
| 2022/0159162 A1* | 5/2022 | Sun | G06T 5/003 |

FOREIGN PATENT DOCUMENTS

| | | |
|---|---|---|
| JP | 2016-208438 A | 12/2016 |
| KR | 10-1640456 B1 | 7/2016 |
| KR | 10-2018-0136973 A | 12/2018 |
| WO | WO-2021147374 A1 * | 7/2021 |

OTHER PUBLICATIONS

Sundar, V., et al. "Deep Atrous Guided Filter for Image Restoration in Under Display Cameras," and Supplementary Material, arXiv preprint arXiv:2008.06229v2, Sep. 1, 2020, 23 pages.

Wikipedia, "High-dynamic-range imaging," https://en.wikipedia.org/wiki/High-dynamic-range_imaging, Aug. 30, 2021, pp. 1-11.

\* cited by examiner

FIG. 1
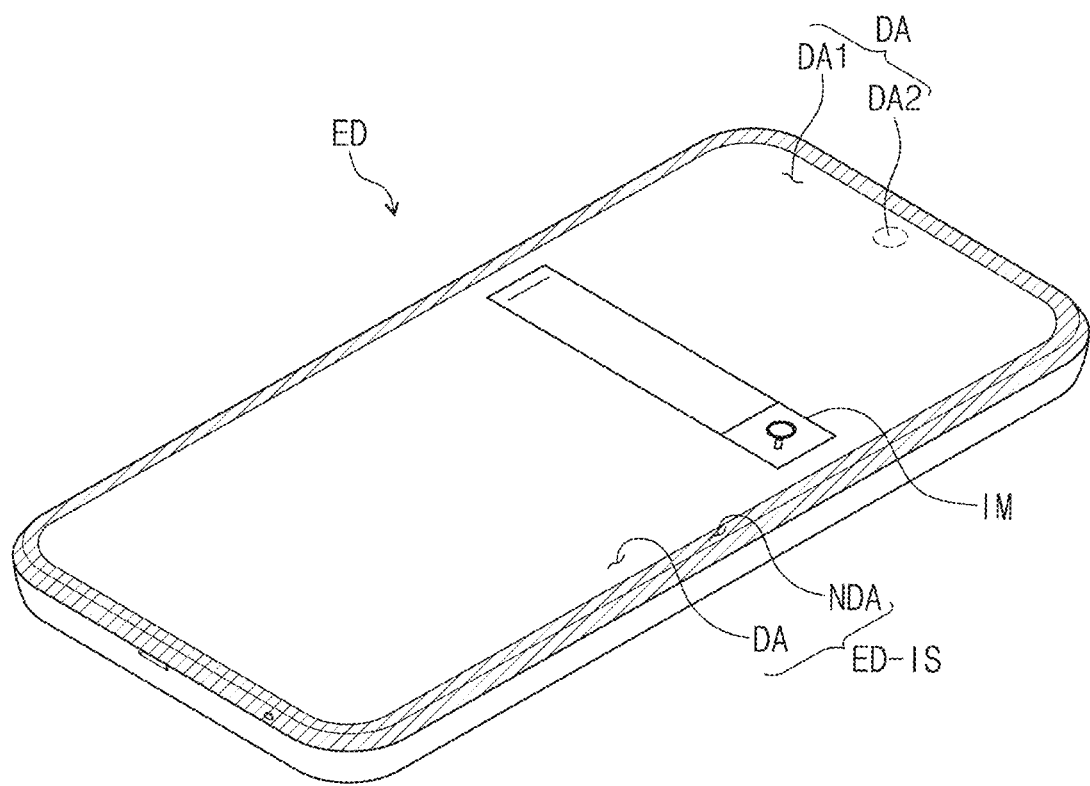
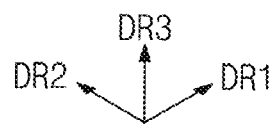

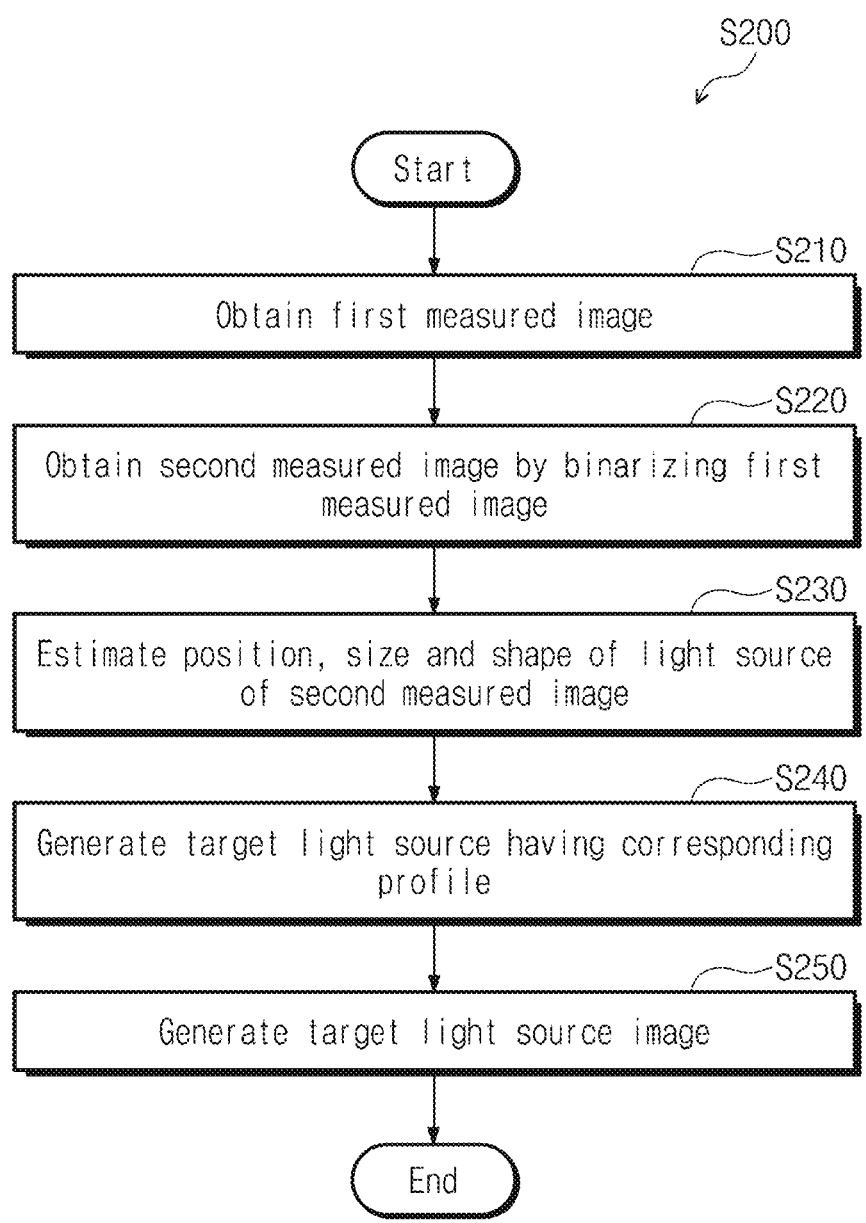

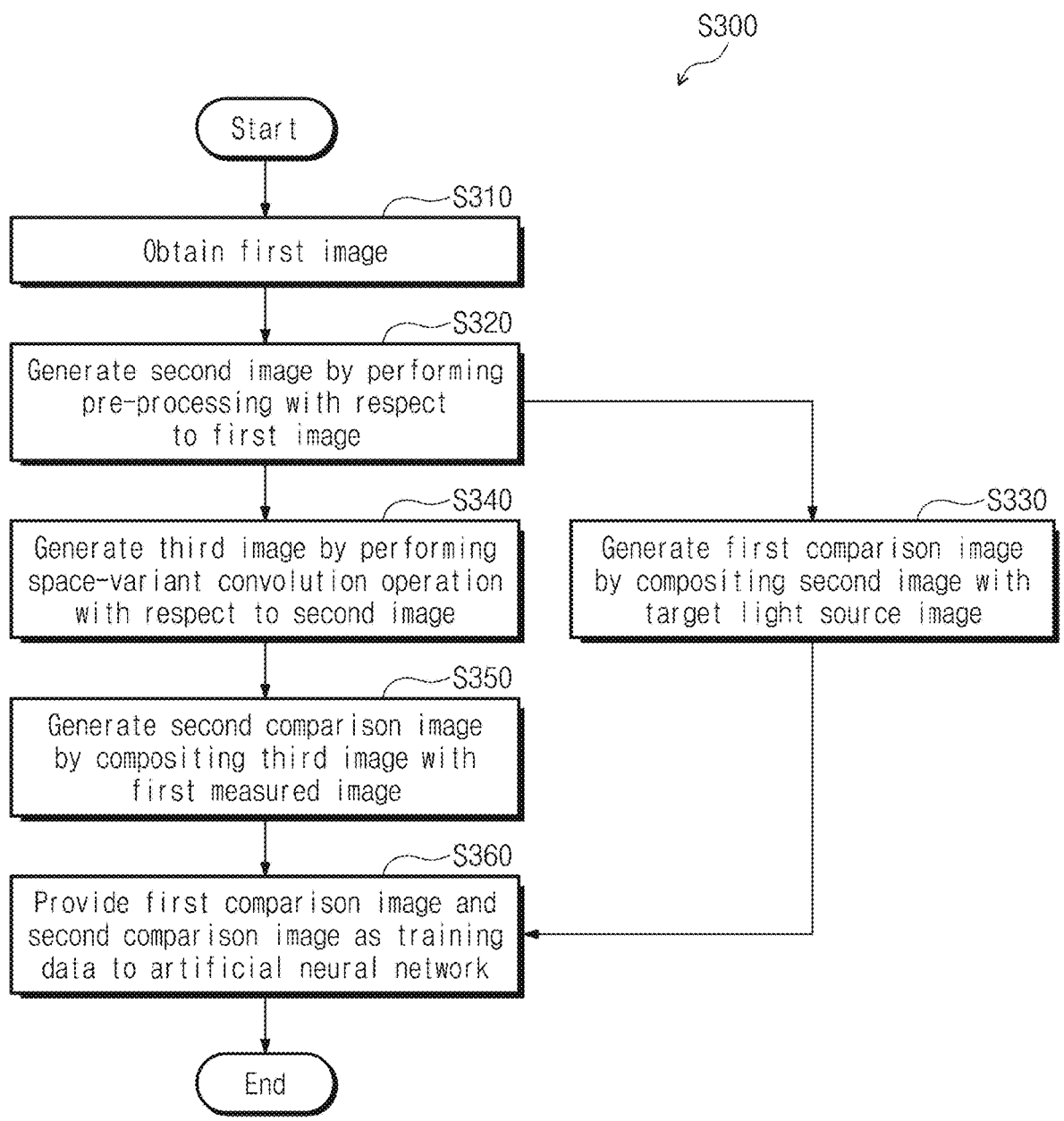

ELECTRONIC DEVICE THAT COMPENSATES FOR LIGHT PASSING THROUGH A DISPLAY, AND DRIVING METHOD FOR THE SAME

CROSS-REFERENCE TO RELATED APPLICATIONS

This application claims priority to and the benefit of Korean Patent Application No. 10-2021-0068447 filed on May 27, 2021 in the Korean Intellectual Property Office, the disclosures of which are incorporated by reference herein in their entireties.

BACKGROUND

Embodiments of the present disclosure relate to an electronic device capable of compensating an image captured by a camera and a driving method for the same.

As a portable electronic device is extensively spread, various functions are being provided in the portable electronic device. A user may prefer an electronic device having a display region that is larger and a non-display region that is smaller. To reduce the area of the non-display region, various types of electronic devices have been developed. For example, to expand a region to display an image in the electronic device, an electronic module, such as a camera module, has been placed in the region to display an image.

SUMMARY

Embodiments of the present disclosure provide an electronic device for compensating an image captured by a camera, which is located under a display region of a display panel, and a driving method including a compensating method for the same.

According to some embodiments, a method for driving an electronic device is described. The method may include receiving light passing through a display panel, generating an image signal based on the light, compensating the image signal with a compensation algorithm to generate a compensated image signal, wherein the compensation algorithm is trained with training data including a first comparison image and a second comparison image, and displaying, on the display panel, a compensated image based on the compensated image signal, wherein the first comparison image is a target restoration image and the second comparison image is a composite image.

The second comparison image may be a simulation image reproducing an image generated by the light passing through the display panel, wherein the simulation image is generated by composing a processed image formed based on light that does not pass through the display panel with an artificial light source.

The second comparison image may be a simulation image generated to reproduce an image generated by the light passing through the display panel, wherein the simulation image is generated by composing a processed image formed based on light that does not pass through the display panel with a measured image captured based on the light passing through the display panel.

The training data may be generated by obtaining a first image, generating a second image by performing pre-processing with respect to the first image, generating a third image by adding an artificial light source to the second image, and generating the first comparison image by performing a clipping process and a gamma process with respect to the third image.

The training data may be generated by generating a fourth image by performing a space-variant convolution operation with respect to the third image, generating a fifth image by applying a characteristic to the fourth image, and generating the second comparison image by performing the clipping process and the gamma process with respect to the fifth image.

The first image may be an image generated through light that does not pass through the display panel.

The training data may be generated by obtaining a first image, generating a second image by performing pre-processing with respect to the first image, and generating the first comparison image by composing the second image with a target light source image.

The training data may be generated by generating a third image by performing a space-variant convolution operation with respect to the second image, and generating the second comparison image by composing the third image with a first measured image.

The target light source image may be generated by obtaining a second measured image by binarizing the first measured image, estimating a position, a size, and a shape of a light source of the second measured image, generating a target light source by using a profile, and generating the target light source image based on the target light source.

The first image may be an image generated by the light that does not pass through the display panel, wherein the first measured image is an image captured based on the light passing through the display panel, and wherein the second comparison image is a composite image obtained by composing an image, which is obtained by processing the first image, with the first measured image.

The compensation algorithm may be trained by a training method including generating a first high dynamic range (HDR) image by restoring the composite image through an HDR image restoration neural network, and comparing the first HDR image with the first comparison image.

The training method may further include generating a second HDR image through deconvolution for the first HDR image using a point spread function, generating a restored image by performing a first clipping process and a first gamma process with respect to the second HDR image, and comparing the restored image with the target restoration image, wherein the target restoration image is generated by performing a second clipping process and a second gamma process with respect to the first comparison image.

The training data may be generated by obtaining a first image, generating a second image by performing pre-processing with respect to the first image, and generating a third image by adding an artificial light source to the second image, wherein the first comparison image is a target HDR image.

The training data may be further generated by generating a fourth image by performing a space-variant convolution operation with respect to the third image, generating a fifth image by applying another characteristic to the fourth image, and generating the second comparison image by performing a clipping process and a gamma process with respect to the fifth image.

The compensation algorithm may be trained by a training method further including generating a plurality of comparison images by adjusting exposure of the second comparison image, and generating a restored image by providing the plurality of comparison images to an image restoration neural network.

The training data may be generated by obtaining a first image, generating a second image by performing pre-processing with respect to the first image, generating a third image by adding an artificial light source to the second image, generating a fourth image by performing a space-variant convolution operation with respect to the third image, and generating the second comparison image by applying other characteristics to the fourth image, wherein the second comparison image is a composite HDR image.

The compensation algorithm may be trained by a training method including generating a first low-resolution image by down-sampling the second comparison image, generating a second low-resolution image by providing the first low-resolution image to a low-resolution neural network, generating a low-resolution guided filter based on the first low-resolution image and the second low-resolution image, generating a guided filter by up-sampling the low-resolution guided filter, and generating a restored image obtained by restoring the second comparison image using the guided filter.

The training method may further include generating a high-resolution image by providing the second comparison image to a high-resolution pre-processing neural network, calculating the high-resolution image using the guided filter to and providing calculated data to a fusion neural network, and generating the restored image using the fusion neural network.

The training method may further include comparing the restored image with the first comparison image.

According to other embodiments, an electronic device may include a display panel including a first display region having a first light transmittance and a second display region having a second light transmittance greater than the first light transmittance, a camera module under the display panel and overlapping the second display region, and outputting an image signal, and a compensator configured to generate a compensated image signal by compensating the image signal by a compensation algorithm, wherein the compensation algorithm is trained with training data including a first comparison image and a second comparison image, wherein the first comparison image is a target restoration image, and wherein the second comparison image is a composite image obtained by reproducing an image generated by light passing through the display panel.

The second comparison image may be a simulation image generated to reproduce an image, which is generated by the light passing through the display panel, wherein the simulation image is generated by composing a processed image formed based on light that does not pass through the display panel with an artificial light source.

The second comparison image may be a simulation image generated to reproduce an image captured based on the light passing through the display panel, wherein the simulation image is generated by composing a processed image formed based on light that does not pass through the display panel with a measured image captured based on the light passing through the display panel.

The second display region and the camera module may each be provided in plurality. The plurality of camera modules overlap the plurality of second display regions in one-to-one correspondence, and wherein image signals output from the plurality of camera modules are compensated by the compensation algorithm.

According to other embodiments, an electronic device may include a display panel including a display region to display an image, a camera module under the display panel, and configured to overlap the display region and output an image signal, and a compensator configured to generate a compensated image signal by compensating the image signal through a compensation algorithm, wherein the compensation algorithm is trained by a target image and a simulation image generated to reproduce an image captured based on light passing through the display panel.

BRIEF DESCRIPTION OF THE FIGURES

The above and other aspects of the present disclosure will become apparent by describing in detail embodiments thereof with reference to the accompanying drawings.

FIG. 1 is a perspective view of an electronic device, according to various embodiments of the present disclosure;

FIG. 9 is a flowchart of a method for generating data for training an artificial neural network, according to various embodiments of the present disclosure;

FIG. 11 is a flowchart of a method for generating data for training an artificial neural network, according to various embodiments of the present disclosure;

DETAILED DESCRIPTION

Figure 2:
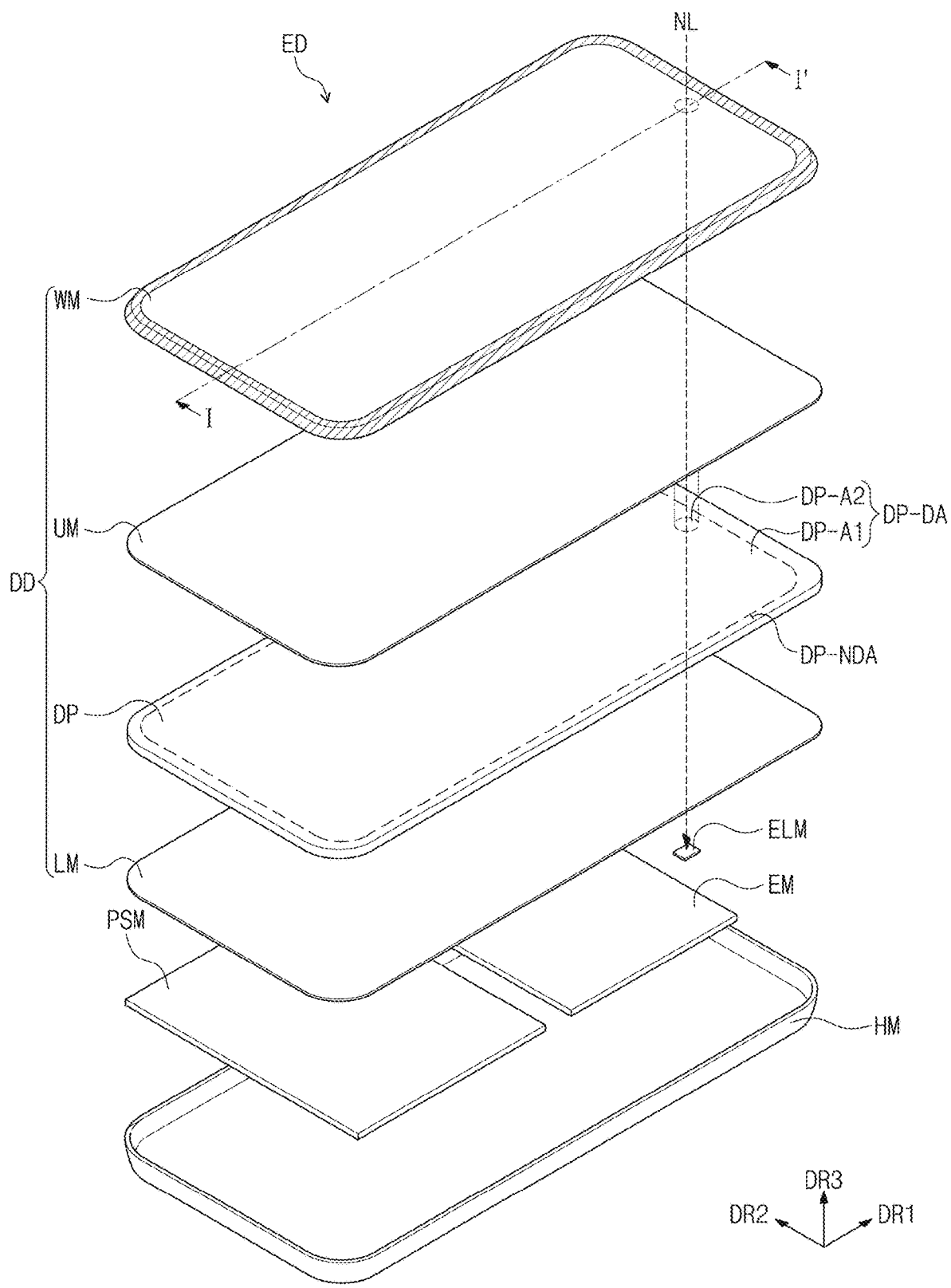
FIG. 2 is an exploded perspective view of an electronic device, according to various embodiments of the present disclosure.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects of the present disclosure to those skilled in the art. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements, layers, and regions may be exaggerated for clarity. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result, for example, of manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the particular illustrated shapes of regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the drawings are schematic in nature and their shapes are not intended to illustrate the actual shape of a region of a device and are not intended to be limiting. Additionally, as those skilled in the art would realize, the described embodiments may be modified in various different ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, in this specification, the phrase "on a plane," or "plan view," means viewing a target portion from the top, and the phrase "on a cross-section" means viewing a cross-section formed by vertically cutting a target portion from the side.

It will be understood that when an element, layer, region, or component is referred to as being "formed on," "on," "connected to," or "coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," when preceding a list of elements, modify the entire list of elements and do not modify the individual elements of the list. For example, "at least one of X, Y, and Z," "at least one of X, Y, or Z," and "at least one selected from the group consisting of X, Y, and Z" may be construed as X only, Y only, Z only, any combination of two or more of X, Y, and Z, such as, for instance, XYZ, XYY, YZ, and ZZ, or any variation thereof. Similarly, the expression such as "at least one of A and B" may include A, B, or A and B. As used herein, the term "and/or" includes any and all combinations of one or more of the associated listed items. For example, the expression such as "A and/or B" may include A, B, or A and B. It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first", "second", etc. may also be used herein to differentiate different categories or sets of elements. For conciseness, the terms "first", "second", etc. may represent "first-category (or first-set)", "second-category (or second-set)", etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

When one or more embodiments may be implemented differently, a specific process order may be performed differently from the described order. For example, two consecutively described processes may be performed substantially at the same time or performed in an order opposite to the described order.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 3:
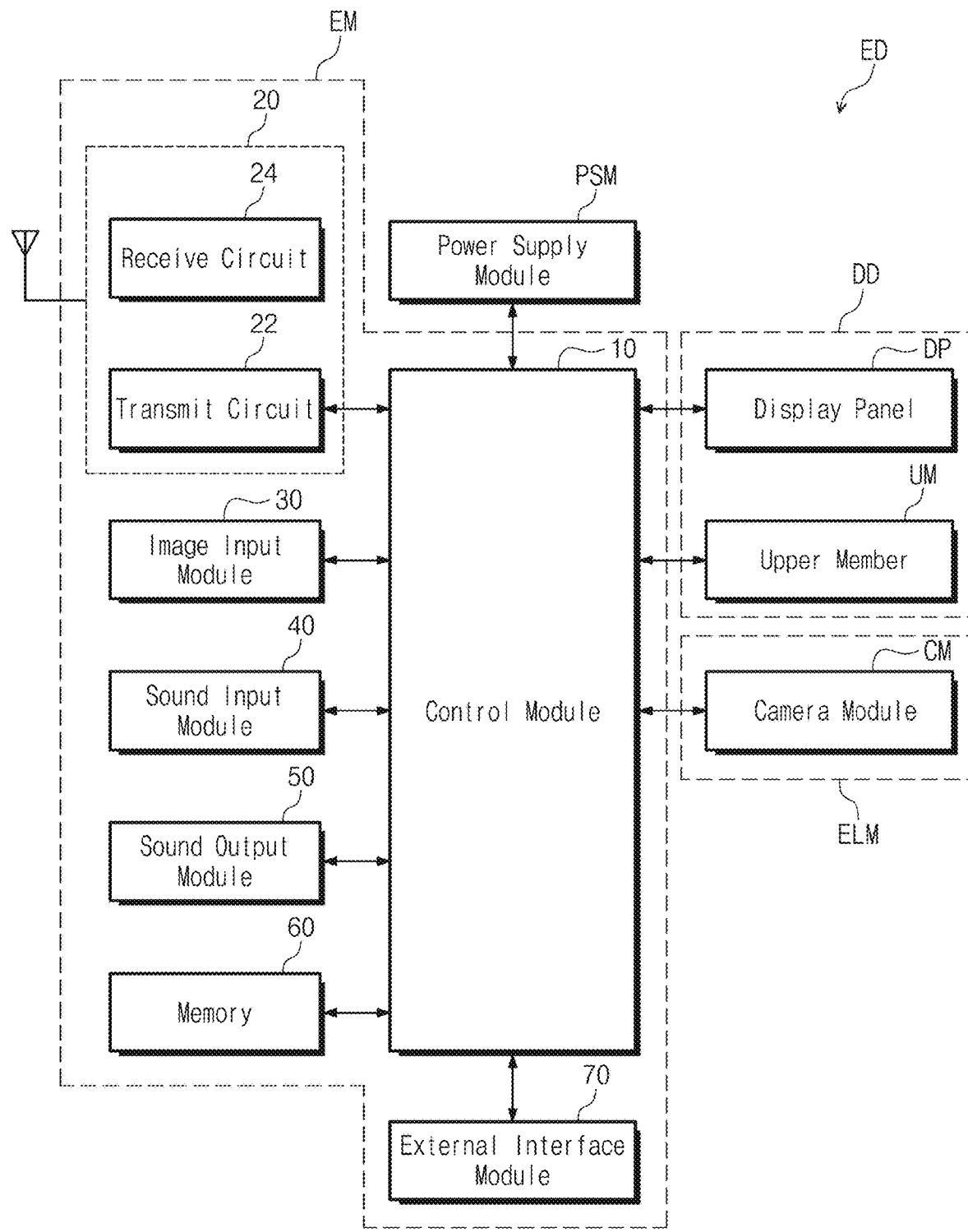
FIG. 3 is a block diagram of an electronic device, according to various embodiments of the present disclosure.

FIG. 1 is a perspective view of an electronic device ED, according to some embodiments of the present disclosure. FIG. 2 is an exploded perspective view of the electronic device ED, according to some embodiments of the present disclosure. FIG. 3 is a block diagram of the electronic device ED, according to some embodiments of the present disclosure.

As illustrated in FIG. 1, the electronic device ED may display an image IM through a display plane ED-IS. The display plane ED-IS is parallel to a plane defined by a first direction axis DR1 and a second direction axis DR2. A third direction axis DR3 indicates a direction normal to the display plane ED-IS, that is, the thickness direction of the electronic device ED. The display plane ED-IS of the electronic device ED may correspond to a front surface of the electronic device ED and may correspond to a top surface of a window WM (see FIG. 2).

The front surface (or top surface) and the rear surface (or bottom surface) of each members or units described below are divided in the third direction axis DR3. However, the first to third direction axes DR1, DR2, and DR3 illustrated according to the present disclosure are merely provided for the illustrative purpose. Hereinafter, first to third directions are defined as directions indicating the first to third direction axes DR1, DR2, and DR3, respectively, and assigned with the same reference numeral.

The display plane ED-IS includes a display region DA and a non-display region NDA adjacent to the display region DA. The non-display region NDA is a region in which an image is not displayed. The non-display region NDA, which is a region that blocks an optical signal (e.g., light), may be a region outside (e.g., at outer sides of) the display region DA in the display plane ED-IS while surrounding the display region DA. According to some embodiments of the present disclosure, the non-display region NDA may be on a side surface of the electronic device ED, instead of on a front surface of the electronic device ED. According to some embodiments, the non-display region NDA may be omitted.

The display region DA may include a first display region DA1 and a second display region DA2. The second display region DA2, which has a lower pixel density or a higher transmittance as compared to that of the first display region DA1, is a region to transmit the optical signal. In this case, the optical signal may be external natural light or an optical signal, such as infrared light, generated from a light emitting device mounted inside the electronic device ED. The type of the optical signal is not limited thereto. The details of the second display region DA2 will be described below.

According to some embodiments, the second display region DA2 may be surrounded by the first display region DA1. Although the second display region DA2 is spaced apart from the non-display region NDA according to some embodiments, the second display region DA2 may extend from the non-display region NDA according to other embodiments.

Although a flat display plane ED-IS is illustrated according to some embodiments, the display plane ED-IS may have curved regions at opposite sides in the second direction DR2 according to some embodiments of the present disclosure. According to some embodiments of the present disclosure, the display plane ED-IS may have curved regions at opposite sides in the first direction DR1 and at opposite sides in the second direction DR2.

Although a cellular phone is illustrated according to some embodiments, the electronic device according to the present disclosure is not limited thereto. For example, the electronic device may be implemented in the forms of various devices, such as a television, a navigation system, a computer monitor, or a game machine, for providing information.

As illustrated in FIGS. 2 and 3, the electronic device ED may include a display device DD, an electronic module EM, an electro-optical module ELM, a power supply module PSM, and a housing HM.

The display device DD generates an image. The display device DD includes the display panel DP, an upper member UM, a lower member LM, and the window WM. The display panel DP includes a first display region DP-A1, a second display region DP-A2, and a non-display region DP-NDA defined to correspond to the first display region DA1 (see FIG. 1), the second display region DA2 (see FIG. 1), and the non-display region NDA (see FIG. 1) of the electronic device ED, respectively.

The display plane ED-IS is not limited to the described examples. For example, the display panel DP may be a light emitting display panel such as an organic light emitting display panel or an inorganic light emitting display panel.

The display device DD may sense external input and/or external pressure depending on components of the upper member UM. The upper member UM may include various members.

According to some embodiments, the upper member UM may include an optical film and an input sensor. The optical film reduces the reflectance of external light. The optical film may include a polarizer and a retarder. The polarizer and the retarder may be provided as a stretching type or as a coating type. The coating type optical film has an optical axis that is defined depending a stretching direction of a functional film. The coating type optical film may include liquid crystal molecules that are aligned on a base film.

The input sensor senses an external input by a user. The input sensor may sense the external input in a capacitive type, a pressure sensing type, or an electromagnetic induction type.

Figure 4:
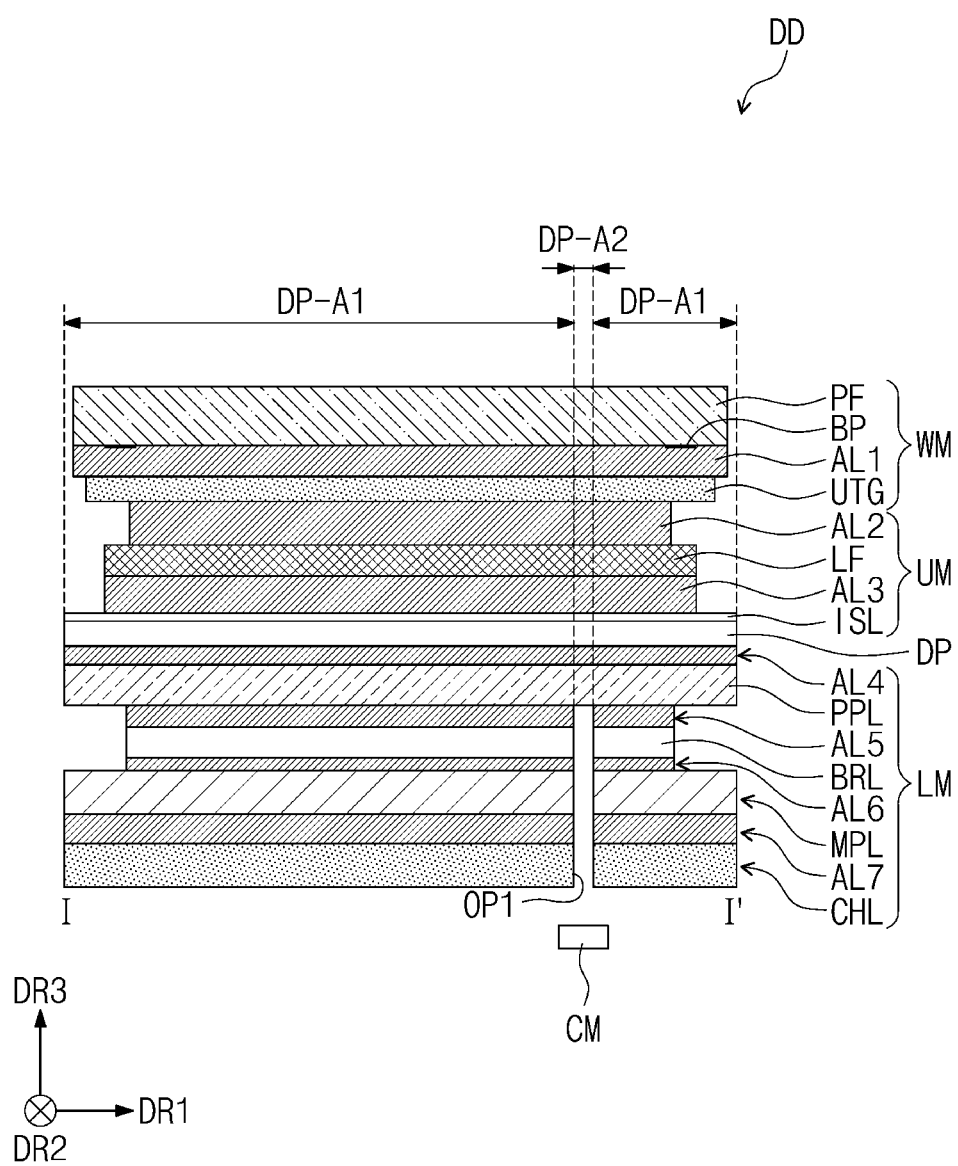
FIG. 4 is a sectional view of a display device, according to various embodiments of the present disclosure.

The lower member LM may include various members. According to the some embodiments, the lower member LM may include a protective layer PPL, a barrier layer BRL, a metal plate MPL, and a cushion layer CHL, as shown in FIG. 4.

The window WM provides an outer appearance of the electronic device ED. The window WM may include a base board, and may further include functional layers, such as an anti-reflection layer and an anti-fingerprint layer.

The electronic module EM includes a control module 10, a wireless communication module 20, an image input module 30, a sound input module 40, a sound output module 50, a memory 60, and an external interface module 70. The modules may be mounted on a circuit board or electrically connected to each other through a flexible circuit board. The electronic module EM is electrically connected to a power supply module PSM.

The control module 10 controls the overall operation of the electronic device ED. For example, the control module 10 activates or deactivates the display device DD in response to a user input. The control module 10 may control the image input module 30, the sound input module 40, or the sound output module 50, in response to the user input. The control module 10 may include at least one microprocessor.

The wireless communication module 20 may transmit/receive a wireless signal to/from another terminal through a BLUETOOTH® or WI-FI™ line. The wireless communication module 20 may transmit/receive a voice signal using a general communication line. The wireless communication module 20 includes a transmit circuit 22 that modulates a signal to be transmitted and transmits the modulated signal, and a receive circuit 24 that demodulates a signal which is received.

The image input module 30 processes an image signal and transforms the image signal into image data to be displayed on the display device DD. The sound input module 40 receives an external sound signal through a microphone in a recording mode, or a voice recognition mode, and transforms the external sound signal into electrical voice data. The sound output module 50 transforms sound data received from the wireless communication module 20 or sound data stored in the memory 60 and outputs the transformed sound data to the outside.

The external interface module 70 serves as an interface connected to an external charger, a wired/wireless data port, or a card socket (for example, a socket for a memory card or a subscriber identity module (SIM)/user identity module (UIM) card).

The power supply module PSM supplies power required for the overall operation of the electronic device ED. The power supply module PSM may include a battery device.

The housing HM illustrated in FIG. 2 is coupled to the display device DD, for example, to the window WM to receive other modules (e.g., upper member UM, display panel DP, lower member LM, power supply module PSM, and electronic module EM). FIG. 2 illustrates the housing HM including one member. However, the housing HM may include at least two parts to be assembled with each other.

An electro-optical module ELM may be an electronic component that outputs or receives an optical signal. The electro-optical module ELM transmits or receives an optical signal through a partial region of the display device DD corresponding to the second display region DP-A2. According to some embodiments, the electro-optical module ELM may include a camera module CM. The camera module CM receives natural light NL through the second display region DP-A2 to capture an external image. The electro-optical module ELM may further include a proximity sensor or an infrared light emitting sensor.

The electro-optical module ELM is under (e.g., below) the display device DD. The electro-optical module ELM overlaps the second display region DP-A2 of the display panel DP in the display device DD. The second display region DP-A2 of the display panel DP in the display device DD has a higher light transmittance than those of other regions of the display panel DP in the display device DD. Hereinafter, the details of the display device DD will be described in more detail.

FIG. 4 is a sectional view of a display device DD, according to some embodiments of the present disclosure. Hereinafter, the details of components that are the same as the components described with reference to FIG. 1 to FIG. 3 will be omitted.

According to some embodiments, the display device DD includes the window WM, the upper member UM, the display panel DP, and the lower member LM.

The window WM may include a thin glass substrate UTG, a window protective layer PF on (e.g., above) the thin glass substrate UTG, and a bezel pattern BP on a bottom surface of the window protective layer PF. According to some embodiments, the window protective layer PF may include a plastic film. Accordingly, the window WM may further include an adhesive layer AL1 (hereinafter, referred to as a first adhesive layer AL1) for bonding the window protective layer PF (or plastic film) to the thin glass substrate UTG. In some embodiments, the thin glass substrate UTG may be substituted with a plastic film.

The upper member UM may include an optical film LF and an input sensor ISL on the display panel DP. Although the input sensor ISL is directly on the display panel DP by way of example, according to some embodiments, an adhesive layer may be further interposed between the display panel DP and the input sensor ISL.

The lower member LM may include a protective layer PPL, a barrier layer BRL, a metal plate MPL, and a cushion layer CHL under the display panel DP. The display device DD may further include an adhesive layer for bonding the adjacent members of the layers described above to each other. FIG. 4 illustrates not only the first adhesive layer AL1, but also second to seventh adhesive layers AL2 to AL7. The first to seventh adhesive layers AU to AL7 may individually include an adhesive member, such as a pressure sensitive adhesive or an optically clear adhesive. According to some embodiments of the present disclosure, some of the above-described components may be omitted. For example, the metal plate MPL and the seventh adhesive layer AL7 associated with the metal plate MPL may be omitted.

According to various embodiments of the present disclosure, the third adhesive layer AL3 to bond the optical film LF to the input sensor ISL may be omitted. According to some embodiments of the present disclosure, the optical film LF may be directly formed on the input sensor ISL. In some embodiments, the optical film LF may be substituted with coated liquid crystal molecules or color filters.

The protective layer PPL may be under (e.g., below) the display panel DP. The protective layer PPL may be coupled to the display panel DP through the fourth adhesive layer AL4. The protective layer PPL may overlap the first display region DP-A1 and the second display region DP-A2. The protective layer PPL may protect the lower portion of the display panel DP from physical impact. For example, the protective layer PPL may include polyethylene terephthalate, polyurethane, or polyethylene. According to some embodiments of the present disclosure, the protective layer PPL may be omitted.

The fifth adhesive layer AL5 bonds the protective layer PPL to the barrier layer BRL. The barrier layer BRL may be under (e.g., below) the protective layer PPL. The barrier layer BRL may enhance resistance against compressive force resulting from external pressures. Accordingly, the barrier layer BRL may reduce or prevent the display panel DP from being deformed. The barrier layer BRL may include a flexible plastic material, such as polyimide or polyethylene terephthalate.

In addition, the barrier layer BRL may be a colored film having a lower light transmittance. The barrier layer BRL may absorb light incident onto the barrier layer BRL from the outside. For example, the barrier layer BRL may be a black plastic film. When the display device DD is viewed from above the window WM, components under (e.g., below) the barrier layer BRL may not be visible to a user.

The sixth adhesive layer AL6 bonds the barrier layer BRL to the metal plate MPL. The metal plate MPL is under (e.g., below) the barrier layer BRL. The metal plate MPL supports components on the metal plate MPL. The metal plate MPL may enhance a heat radiation property.

The seventh adhesive layer AL7 bonds the cushion layer CHL to the metal plate MPL. The cushion layer CHL may have a lower elastic modulus than that of the metal plate MPL. For example, the cushion layer CHL may include, but is not limited to, thermoplastic polyurethane, rubber, or silicone. The cushion layer CHL can absorb external impact.

The second display region DP-A2 of the display panel DP may have a lower resolution than that of the first display region DP-A1. The second display region DP-A2 of the display panel DP may have a higher transmittance than that of the first display region DP-A1.

An opening OP1 is formed in the members from fifth adhesive layer AL5 to cushion layer CHL (hereinafter referred to as lower layers AL5 to CHL), corresponding to the second display region DP-A2, which are under (e.g., below) the protective layer PPL. Although the lower layers AL5 to CHL include stacked structures that include the fifth adhesive layer AL5 to the cushion layer CHL, the components of the stacked structures are not limited thereto. The external natural light (e.g., natural light NL as shown in FIG. 2) may be incident into a region corresponding to the second display region DA2 of the window WM, may pass through the second display region DP-A2 of the display panel DP, and may be incident to the camera module CM through the opening OP1. The above path corresponds to an incident path of the external light.

The upper member UM, the display panel DP, and the protective layer PPL on the incident path may reduce the transmittance of the external light, and may disperse the external light. However, the opening OP1 increases the transmittance of the external light and decreases the dispersion of external light.

Figure 5A:
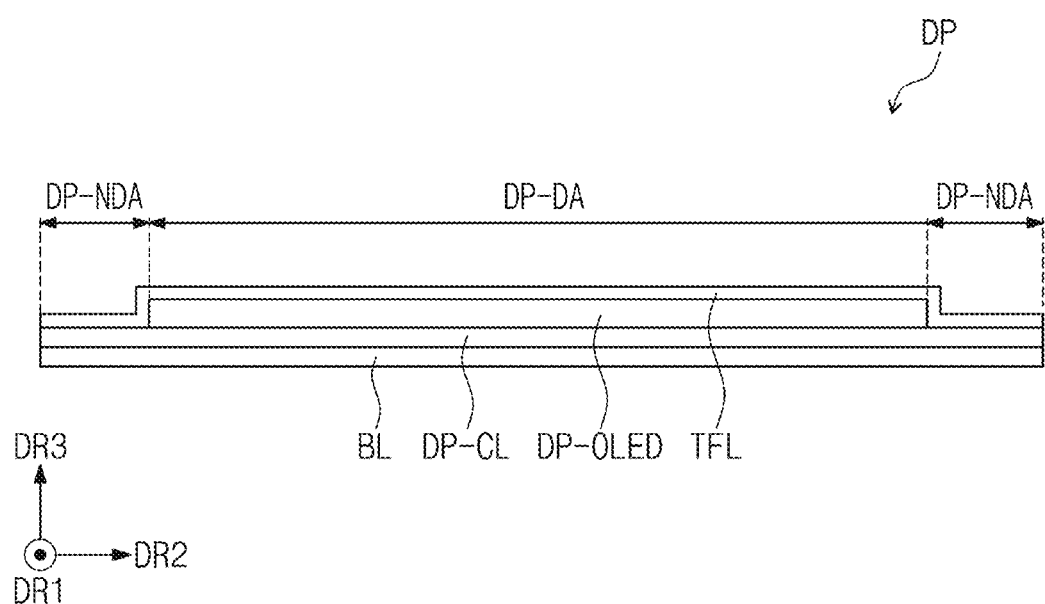
FIG. 5A is a sectional view of a display panel, according to various embodiments of the present disclosure.
Figure 5B:
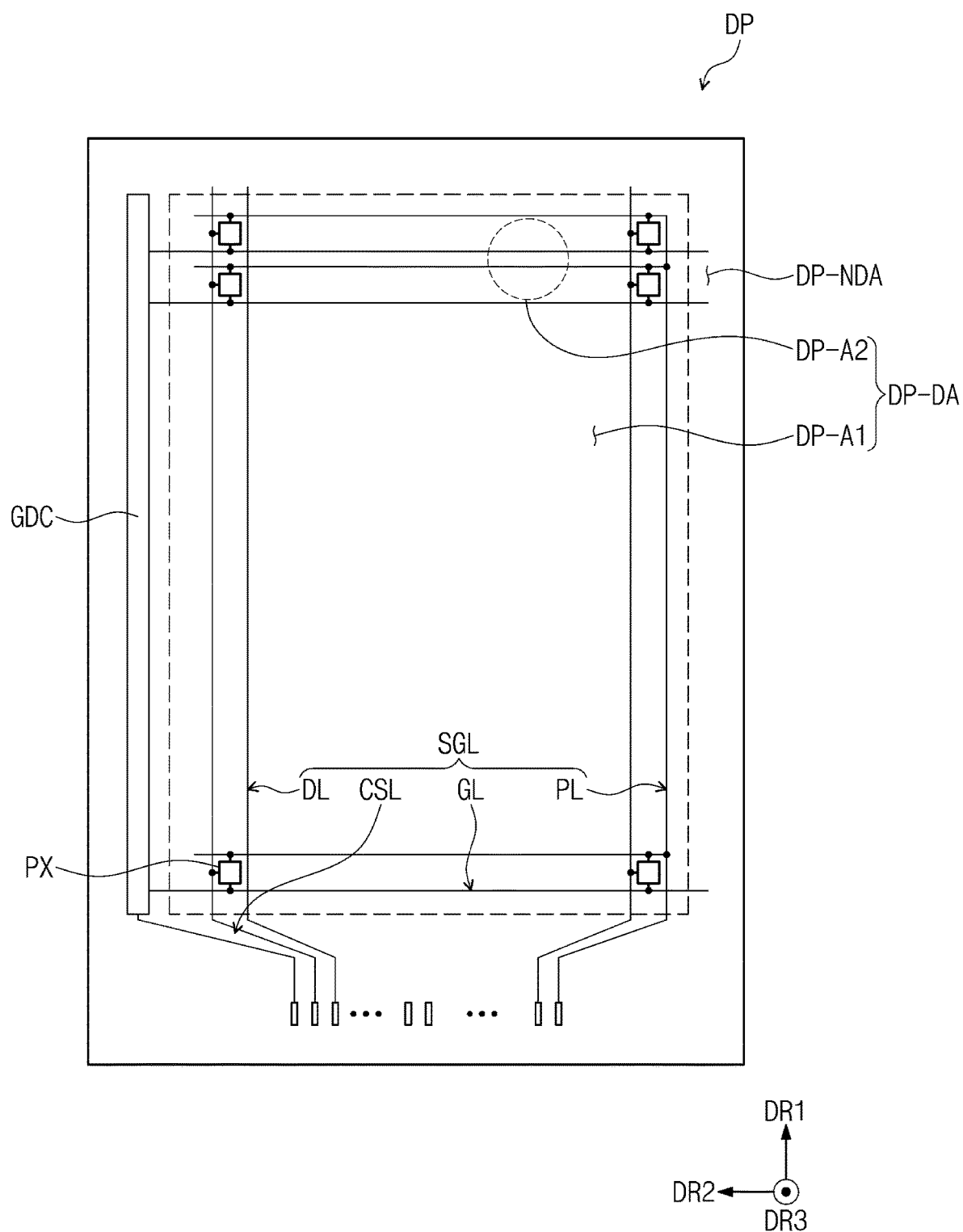
FIG. 5B is a plan view of a display panel, according to various embodiments of the present disclosure.
Figure 5C:
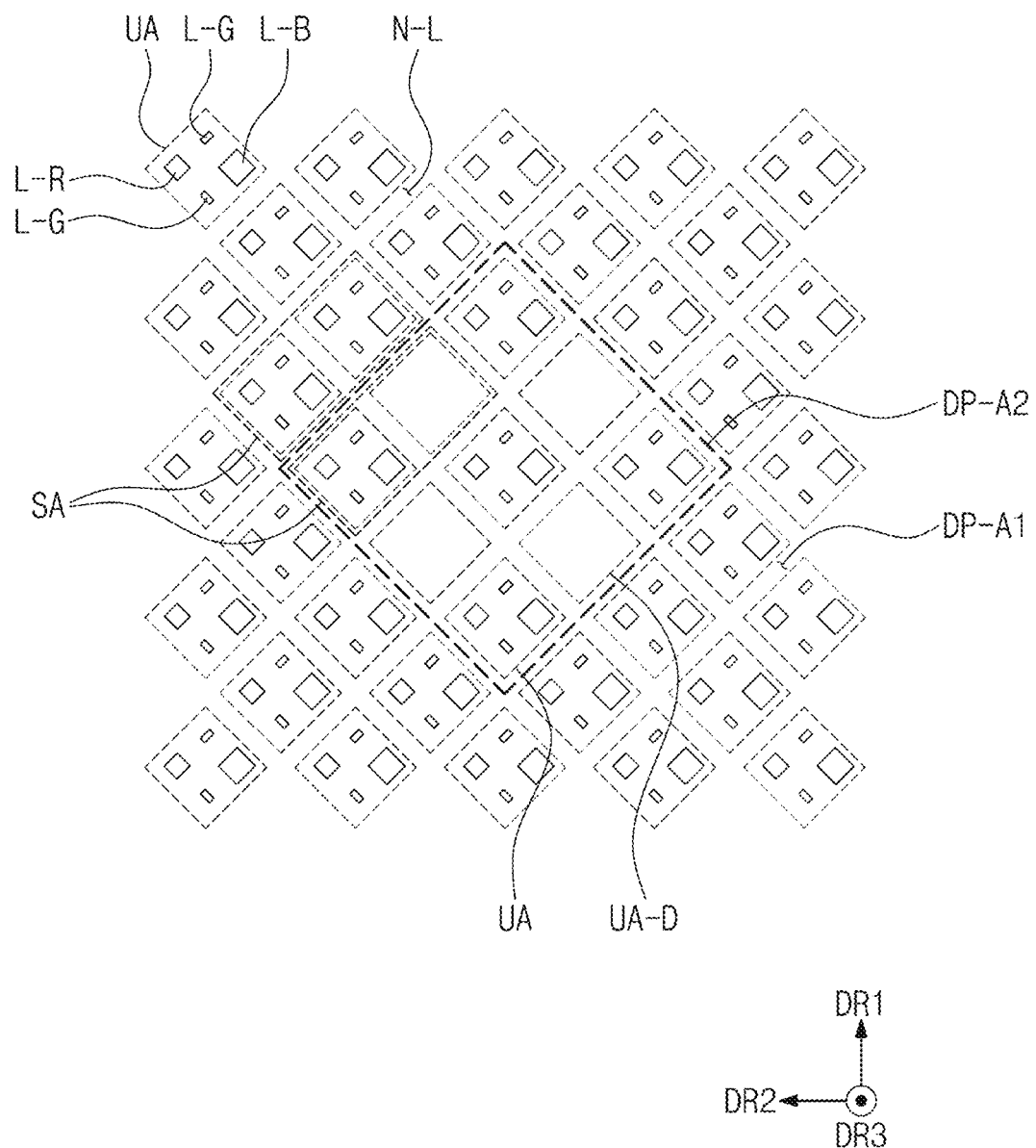
FIG. 5C is an exploded plan view of a display panel, according to various embodiments of the present disclosure.
Figure 5D:
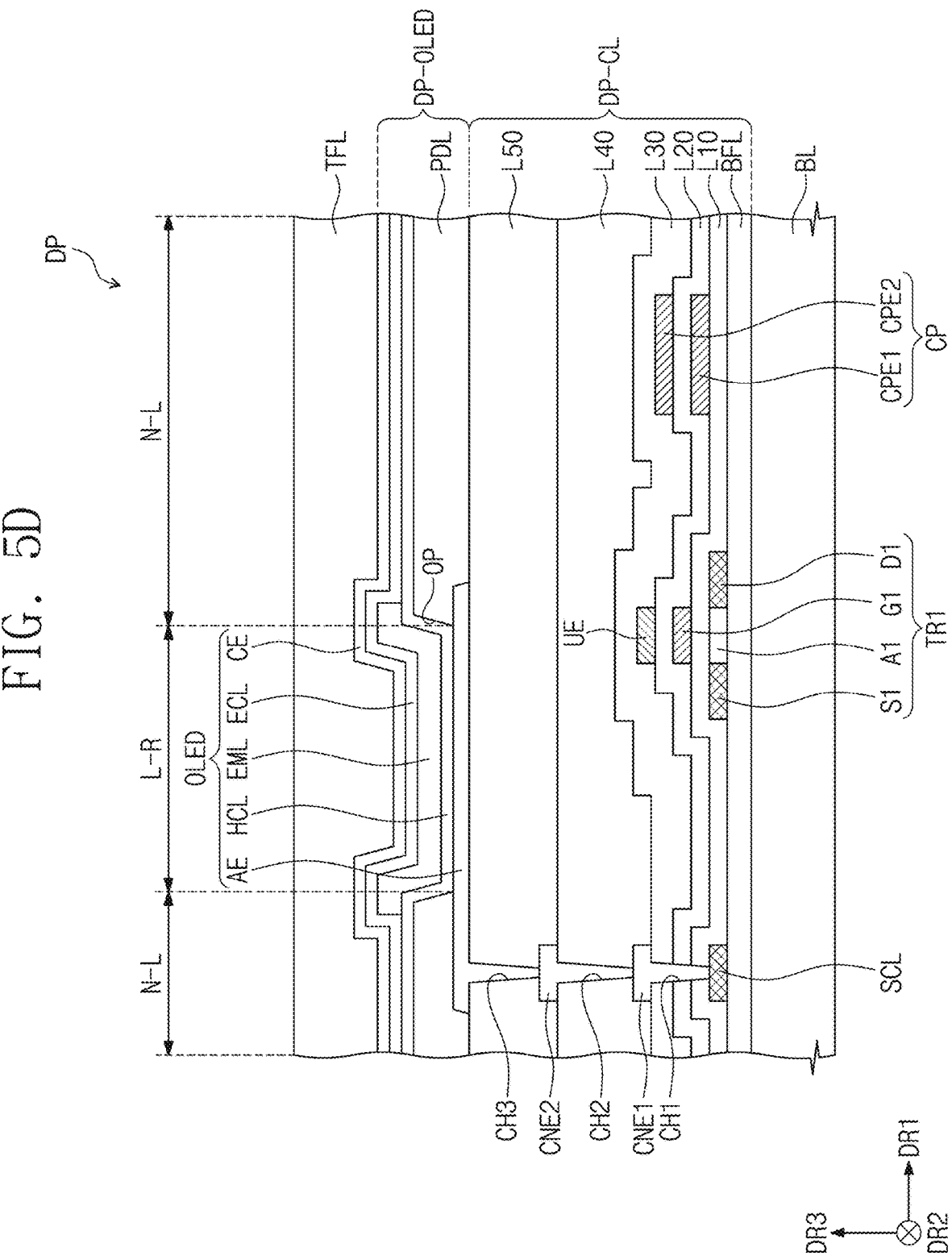
FIG. 5D and FIG. 5E are cross-sectional views of a display panel, according to various embodiments of the present disclosure.
Figure 5E:
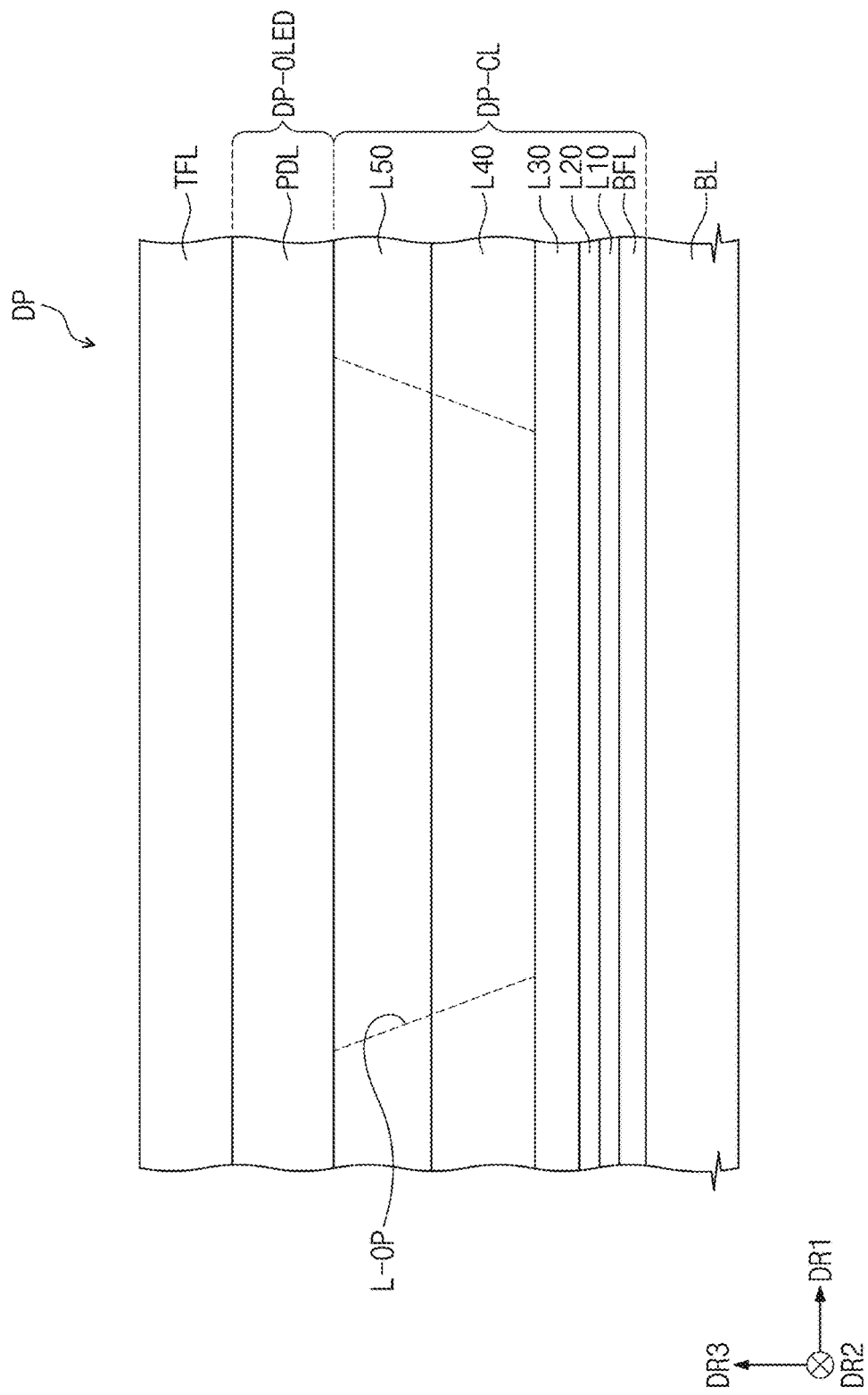

FIG. 5A is a sectional view of the display panel DP, according to some embodiments of the present disclosure. FIG. 5B is a plan view of the display panel DP, according to some embodiments of the present disclosure. FIG. 5C is an exploded plan view of the display panel DP, according to some embodiments of the present disclosure. FIG. 5D and FIG. 5E are cross-sectional views of the display panel DP, according to some embodiments of the present disclosure.

As illustrated in FIG. 5A, the display panel DP includes a base layer BL, a circuit device layer DP-CL on the base layer BL, a display device layer DP-OLED on the circuit device layer DP-CL, and an upper insulating layer TFL on the display device layer DP-OLED.

The base layer BL may include a plastic substrate, a glass substrate, a metal substrate, or an organic/inorganic composite material substrate. The base layer BL may include at least one polyimide layer.

The circuit device layer DP-CL includes at least one insulating layer, semiconductor patterns, and/or conductive patterns. The insulating layer includes at least one inorganic layer and at least one organic layer. The semiconductor patterns and conductive patterns may include signal lines, a pixel driving circuit, and a scan driving circuit. The details thereof will be described.

The display device layer DP-OLED includes a display device, for example, an organic light emitting diode. The display device layer DP-OLED may further include an organic layer such as a pixel defining layer. However, the present disclosure is not limited thereto, and the display device layer DP-OLED may include an inorganic light emitting diode.

The upper insulating layer TFL includes a plurality of thin films. Some thin films are arranged to improve optical efficiency, and some thin films are arranged to protect organic light emitting diodes. The upper insulating layer TFL may include a thin film encapsulation layer formed in a stacked structure including an organic layer/organic layer/inorganic layer.

As illustrated in FIG. 5B, the display panel DP may include a plurality of signal lines SGL, a plurality of pixels PX (hereinafter referred to as pixels PX), and a driving circuit GDC. The pixels PX are in a display region DP-DA. Each of the pixels PX includes an organic light emitting diode and a pixel driving circuit connected to the organic light emitting diode. The signal lines SGL and the pixel driving circuit may be included in the circuit device layer DP-CL illustrated in FIG. 5A.

The second display region DP-A2 has a lower pixel density than that of the first display region DP-A1. When the number of pixels in a given area in the second display region DP-A2 and the number of pixels in a given area of the same size in first display region DP-A1 are compared, the second display region DP-A2 has a fewer number of pixels PX than those in the first display region DP-A1. The regions that do not have the pixel PX correspond to the regions that transmit the optical signal.

The non-display region DP-NDA has no pixels PX therein. The driving circuit GDC is in the non-display region DP-NDA. According to some embodiments, the driving circuit GDC may include a scan driving circuit. The scan driving circuit generates a plurality of scan signals (hereinafter, referred to as scan signal") and sequentially outputs the scan signals to a plurality of scan lines GL (hereinafter, referred to as scan lines GL) to be described later. The scan driving circuit may further output another control signal to driving circuits of the pixels PX.

The scan driving circuit may include a plurality of thin film transistors formed through a process, for example, a low temperature polycrystalline silicon (LTPS) process or a low temperature polycrystalline oxide (LTPO) process, which may be one or more of the same processes as those used to form the driving circuits of the pixels PX.

The signal lines SGL include scan lines GL, data lines DL, a power line PL, and a control signal line CSL. The signal lines SGL may further include separate initialization lines and light emitting control lines. The scan lines GL are respectively connected to relevant pixels PX of the pixels PX, and the data lines DL are respectively connected to relevant pixels PX of the pixels PX. The power line PL is connected to the pixels PX. The control signal line CSL may provide control signals to the scan driving circuit.

In some embodiments, the signal lines SGL may be connected to a circuit board. The signal lines SGL may be connected to a timing control circuit in the form of an integrated chip that is mounted on a circuit board.

As illustrated in FIG. 5C, three types of pixels may be in each of the first display region DP-A1 and the second display region DP-A2. The three types of pixels for generating light having different colors may be defined as corresponding to a first color pixel, a second color pixel, and a third color pixel. Each of the three types of pixels may include a pixel driving circuit and a light emitting device.

FIG. 5C illustrates light emitting regions L-R, L-G, and L-B of light emitting devices. The first light emitting region L-R is the light emitting region of the first color pixel, the second light emitting region L-G is the light emitting region of the second color pixel, and the third light emitting region L-B is the light emitting region of the third color pixel.

The first display region DP-A1 includes a plurality of unit pixel regions UA (defined as a first unit pixel region). The plurality of unit pixel regions UA may have the same arrangement of emitting regions. The plurality of unit pixel regions UA include the first light emitting region L-R, the second light emitting region L-G, and the third light emitting region L-B. According to some embodiments, each of the plurality of unit pixel regions UA includes one first light emitting region L-R, two second light emitting regions L-G, and one third light emitting region L-B. The two second light emitting regions L-G may face each other in the first direction DR1, and the first light emitting region L-R and the third light emitting region L-B may face each other in the second direction DR2.

One of the two second light emitting regions L-G may be defined as a fourth light emitting region distinct from the second light emitting region L-G. As illustrated in FIG. 5C, the shape of the second light emitting region and the fourth light emitting region may be different from each other when viewed from a plan view. The number, type, and arrangement shape of the light emitting regions included in the plurality of unit pixel regions UA are not limited thereto.

According to some embodiments, one first light emitting region L-R may generate a red light. Each of the two second light emitting regions L-G may generate a green light. One third light emitting region L-B may generate a blue light. In some embodiments, red light, green light or blue light may be changed to lights of three different primary colors.

In some embodiments, the plurality of unit pixel regions UA (defined as a second unit pixel region) may be arranged in the second display region DP-A2. However, the second display region DP-A2 has a smaller number of light emitting regions per unit region SA, as compared to those of the first display region DP-A1. As illustrated in FIG. 5C, the second display region DP-A2 may have a fewer number of unit pixel regions UA per unit region SA, as compared to those of the first display region DP-A1. The pixel density may be derived by comparing the number of light emitting regions per unit regions.

According to some embodiments of the present disclosure, the first display region DP-A1 may be different from the second display region DP-A2 in the unit in which a pixel is repeated. In other words, the unit pixel regions of the second display region DP-A2 may have an arrangement that is different from that of the first display region DP-A1.

As illustrated in FIG. 5C, a plurality of non-unit pixel regions UA-D may be located in the second display region DP-A2. There might be no pixel present in the non-unit pixel region UA-D. That is, at least the light emitting device may be omitted from the non-unit pixel region UA-D. Therefore, the optical signal (e.g., light) may travel through the non-unit pixel region UA-D.

In some embodiments, the non-unit pixel region UA-D may have an area corresponding to the area of the unit pixel region UA. In other embodiments, the non-unit pixel region UA-D does not necessarily have the same area as that of the unit pixel region UA. When the unit pixel region UA includes at least three light emitting regions L-R, L-G, and L-B as described above, the non-unit pixel region UA-D may have an area that is larger than the sum of areas of at least two light emitting regions among at least three light emitting regions L-R, L-G, and L-B.

FIG. 5D illustrates a cross-sectional view of the display panel DP corresponding to the first light emitting region L-R among the light emitting regions L-R, L-G, and L-B, and illustrates a cross-sectional view of one transistor TR1 constituting a pixel driving circuit and an organic light emitting diode OLED corresponding to the light emitting device.

A transistor TR1 and an organic light emitting diode OLED are on the base layer BL. The base layer BL may include a synthetic resin layer. The circuit device layer DP-CL is on the base layer BL.

According to some embodiments, the circuit device layer DP-CL may include a buffer layer BFL, a first intermediate inorganic layer L10, a second intermediate inorganic layer L20, and a third intermediate inorganic layer L30, which are inorganic layers, and a first intermediate organic layer L40 and a second intermediate organic layer L50, which are organic layers.

A semiconductor pattern is on the buffer layer BFL. The semiconductor pattern may include a silicon semiconductor. The first semiconductor pattern may include polysilicon. However, the present disclosure is not limited thereto, and the first semiconductor pattern may include amorphous silicon. The semiconductor pattern may include a metal oxide semiconductor.

The semiconductor pattern may have an electrical characteristic depending on whether the semiconductor pattern is doped or not. The semiconductor pattern may include a first region and a second region. The first region may be doped with an N-type dopant or a P-type dopant. For example, a P-type transistor includes a first region doped with a P-type dopant. The second region may be a region that is not doped with an N-type dopant or a P-type dopant, or a region doped to have a density that is lower than that of the first region.

The conductivity of the first region may be greater than that of the second region, and the first region substantially functions as an electrode or a signal line. The second region substantially corresponds to an active region (or channel) of the transistor. In other words, a portion of the semiconductor pattern may be the active region (or channel) of the transistor, another portion of the semiconductor pattern may be a source (or an input electrode region) or drain (an output electrode region) of the transistor, and still another portion of the semiconductor pattern may be a connection signal line (or connection electrode).

As illustrated in FIG. 5D, a source S1, an active region A1 (the active region), and a drain D1 of the transistor TR1 are formed by a semiconductor pattern. A portion of a connection signal line SCL may be formed by the semiconductor pattern. In some embodiments, the connection signal line SCL may be connected to another transistor (for example, a driving transistor) constituting a pixel driving circuit when viewed on a plan view.

A control electrode G1 is on the first intermediate inorganic layer L10 to overlap the active region A1. A first capacitor electrode CPE1 of a capacitor CP is on the first intermediate inorganic layer L10. A second capacitor electrode CPE2 of the capacitor CP is on the second intermediate inorganic layer L20. An upper electrode UE is on the second intermediate inorganic layer L20 to overlap the control electrode G1.

A first connection electrode CNE1 may be on the third intermediate inorganic layer L30. The first connection electrode CNE1 may be connected to the connection signal line SCL through a first through hole CH1. A second connection electrode CNE2 may be on the first intermediate organic layer L40. The second connection electrode CNE2 may be connected to the first connection electrode CNE1 through a second through hole CH2. In some embodiments, conductive patterns different from that of the first connection electrode CNE1 are formed on the third intermediate inorganic layer L30, and conductive patterns different from that of the second connection electrode CNE2 may be on the first intermediate organic layer L40. The conductive patterns may include a signal line, for example, a data line DL (see FIG. 5B).

A first electrode AE is on the second intermediate organic layer L50. The first electrode AE may be connected to the second connection electrode CNE2 through a third through hole CH3. A light emitting opening OP is defined in a pixel defining layer PDL. The light emitting opening OP of the pixel defining layer PDL exposes at least a portion of the first electrode AE.

The display region DP-DA (see FIG. 5B) may include a light emitting region L-R, and a non-light emitting region N-L adjacent to the light emitting region L-R. The non-light emitting region N-L may surround the light emitting region L-R. According to some embodiments, the light emitting region L-R is defined to correspond to a partial region of the first electrode AE, which is exposed through the light emitting opening OP.

A hole control layer HCL may be in the light emitting region L-R and the non-light emitting region N-L. The hole control layer HCL may include a hole transport layer, and may further include a hole injection layer. A light emitting layer EML is on the hole control layer HCL. The light emitting layer EML may be in a region corresponding to the light emitting opening OP. In other words, light emitting layers EML are formed in pixels and separated from each other. The light emitting layer EML may include an organic material and/or an inorganic material. The light emitting layer EML may generate color light having a corresponding color.

An electron control layer ECL is on the light emitting layer EML. The electron control layer ECL may include an electron transport layer, and may further include an electron injection layer. The hole control layer HCL and the electron control layer ECL may be formed in the plurality of pixels through an open mask. A second electrode CE is on the electron control layer ECL. The second electrode CE is in the plurality of pixels in common. The upper insulating layer TFL is on the second electrode CE. The upper insulating layer TFL includes a plurality of thin films. A plurality of thin films may include an organic film and/or an inorganic film.

FIG. 5E illustrates a cross-sectional view of the display panel DP corresponding to the non-unit pixel region UA-D (see FIG. 5C). Unlike the cross-sectional view corresponding to the first light emitting region L-R, there are no semiconductor patterns and conductive patterns in the non-unit pixel region UA-D, but an insulating layer is provided. Because the semiconductor patterns and the conductive patterns interrupt the transmission of the optical signal, the semiconductor patterns and the conductive patterns are excluded from the non-unit pixel region UA-D.

As illustrated by a dotted line in FIG. 5E, an opening L-OP may be defined in the non-unit pixel region UA-D (see FIG. 5C) of some insulating layers such as the first intermediate organic layer L40 and the second intermediate organic layer L50. The pixel defining layer PDL and the upper insulating layer TFL are filled in the opening L-OP, and the relevant region in the non-unit pixel region UA-D has a thinner insulating layer thickness than those of other regions. The transmittance of the optical signal may be increased by reducing the thickness of the insulating layer corresponding to the non-unit pixel region UA-D.

In some embodiments, an entirety of the organic light emitting diode OLED (see FIG. 5D), or a portion of the organic light emitting diode OLED corresponding to the first light emitting region L-R, may be omitted from the non-unit pixel region UA-D. In some embodiments, the first electrode AE of the organic light emitting diode OLED may not be provided.

Figure 6:
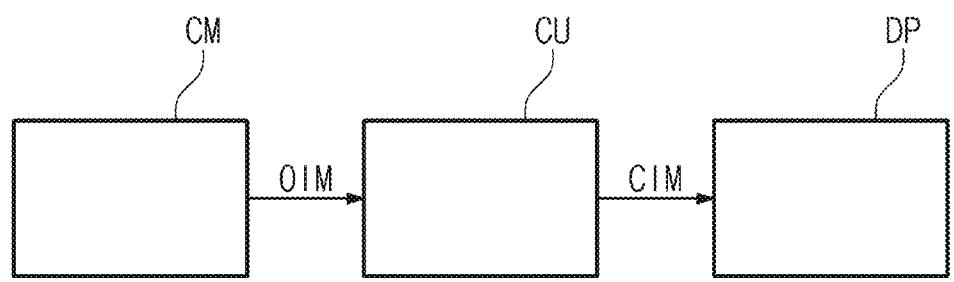
FIG. 6 is a block diagram of an electronic device, according to various embodiments of the present disclosure.

FIG. 6 is a block diagram of an electronic device, according to some embodiments of the present disclosure.

Referring to FIGS. 2 and 6, the electronic device ED may include the camera module CM, a compensator CU, and the display panel DP.

The camera module CM may overlap the second display region DP-A2 of the display panel DP. The camera module CM may receive the light (or natural light NL) passing through the second display region DP-A2, and may generate an image signal OIM based on the light. The image signal OIM may be a signal corresponding to a captured external image.

The light passing through the second display region DP-A2 may be diffracted while passing through the display panel DP, and the quality of the image captured by the camera module CM may be deteriorated. To compensate for the deterioration in the quality of the image, the image signal OIM may be applied to the compensator CU.

The compensator CU may compensate the image signal OIM through a compensation algorithm that is trained using a first comparison image and a second comparison image. The compensator CU may generate a compensated image signal CIM obtained by compensating the image signal OIM. The compensator CU may provide the compensated image signal CIM to the display panel DP, and the display panel DP may display an image corresponding to the compensated image signal CIM.

When a relatively strong light source is included in the image captured by the camera module CM, a diffraction pattern may be strongly generated due to the relatively strong light source. The diffraction pattern may be generated, as light passes through the display panel DP. In this case, when the brightness of the diffraction pattern exceeds a threshold value (e.g., a predetermined threshold value), a saturation phenomenon may occur. When the image is deformed due to diffraction, the image may be restored through a deconvolution operation. However, the deterioration in the quality of the image, which is caused due to saturation, may not be easily restored through the deconvolution operation, because the information is lost.

According to embodiments of the present disclosure, the compensation algorithm may be an artificial neural network trained through the first comparison image and the second comparison image. The first comparison image may be a target image to be compensated, and the second comparison image may be a composite image obtained by reproducing an image generated through light passing through the display panel DP. The image generated through the light may refer to an image captured by the camera module CM, as the camera module CM receives the light.

In some embodiments, the second comparison image may be an image where no information is lost. Accordingly, when the artificial neural network trained using the first comparison image and the second comparison image is used, the performance of restoring the image by the electronic device may be improved. A method of generating the first comparison image and the second comparison image, and a method for training the artificial neural network using the same, will be described later.

According to some embodiments of the present disclosure, all image signals OIM may be applied to the compensator CU and may be compensated by the compensator CU, but the present disclosure is not limited thereto. According to some embodiments of the present disclosure, the image signal OIM may be applied to the compensator CU in a corresponding mode or under a corresponding condition.

For example, when an application is executed, wherein the camera module CM of the electronic device ED operates, the compensator CU may compensate the image signal OIM to generate the compensated image signal CIM. The compensation operation may be selectively performed within the application. For example, the compensation operation may be performed in a corresponding mode within the application, or may be performed for a section (e.g., a predetermined section) of the moving picture. The operation in the mode may be selected by the user.

The compensation algorithm may be provided in the form of software, a driver, or a Media Foundation Transform (MFT), but is not limited thereto. When the compensation algorithm is provided in the form of an MFT, the compensation operation may be performed without limitation as long as the compensation algorithm is used for an application for operating the camera module.

The operation of the compensator CU may be performed by a computation module in the electronic device ED. For example, the compensation operation may be performed by an application processor (AP). In more detail, the compensation operation may be performed by a Neural Processing Unit (NPU), an Image Signal Processor (ISP), a Central Processing Unit (CPU) or a graphics processing unit (GPU), but is not limited thereto.

Figure 7:
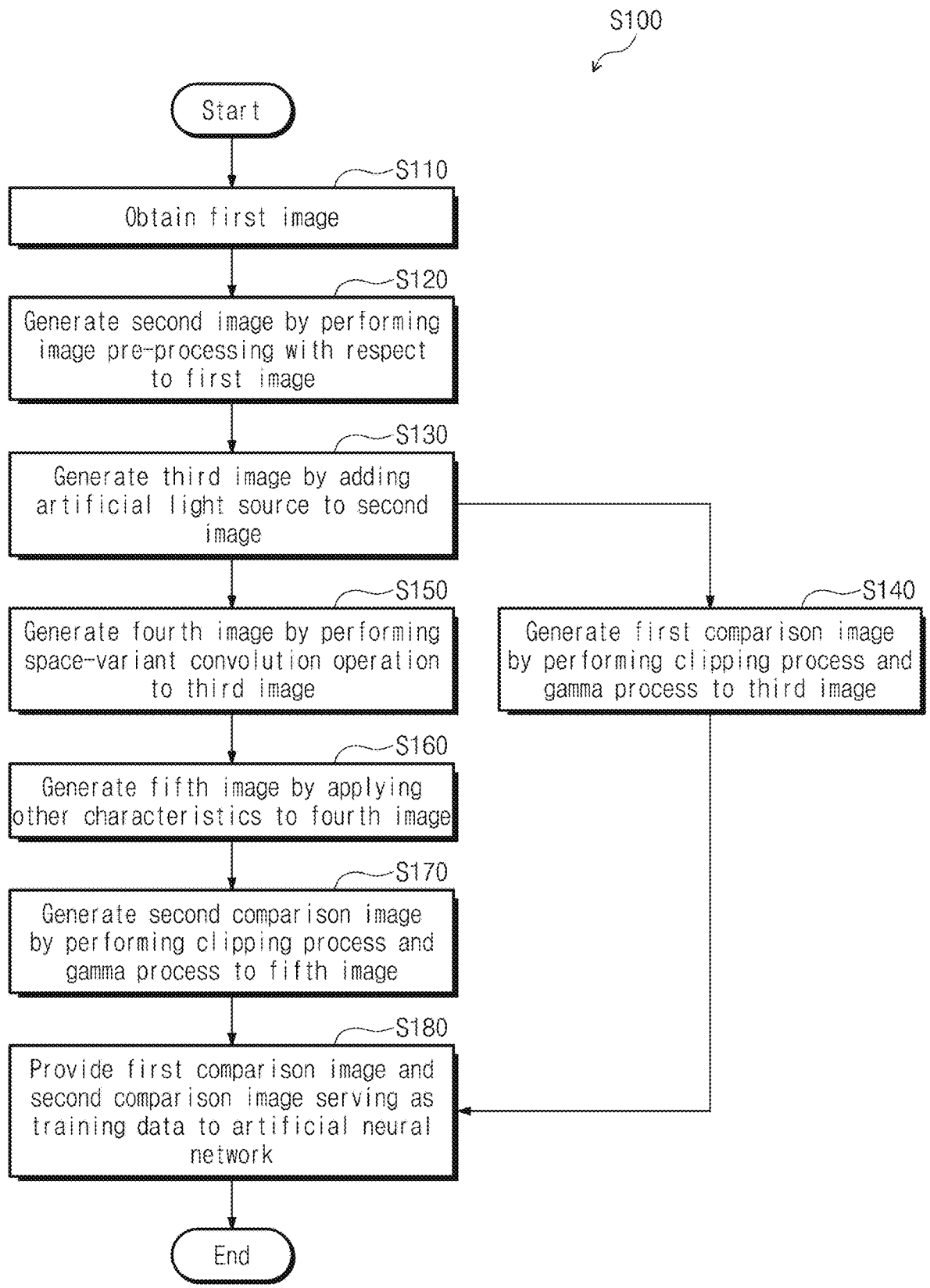
FIG. 7 is a flowchart illustrating a method for generating data for training an artificial neural network, according to various embodiments of the present disclosure.

FIG. 7 is a flowchart of a method for generating training data for training an artificial neural network, according to some embodiments of the present disclosure. FIG. 8A, FIG. 8B, FIG. 8C, and FIG. 8D are views illustrating images, according to some embodiments of the present disclosure.

Referring to FIG. 7, FIG. 8A, FIG. 8B, FIG. 8C, and FIG. 8D, the method for generating training data for training the artificial neural network will be described. All of the reference numerals S100 and S110 to S180 may refer to FIG. 7.

The training data for training the artificial neural network may be generated by a training data generator. The training data generator may include a computing device that may process data, but is not limited thereto.

The training data generator may generate a target restoration image (hereinafter, referred to as the first comparison image) and a compensation image (hereinafter, referred to as the second comparison image) by using a general image captured by the camera. The general image is an image generated by light that does not pass through the display panel DP (see FIG. 2). In other words, the general image may be an image wherein the light is neither diffracted nor deteriorated by the display panel DP (see FIG. 2). The first comparison image may be a composite image for restoration, and the second comparison image may be a composite image or a simulation image corresponding to the image generated through light passing through the display panel DP (see FIG. 2).

Figure 8A:
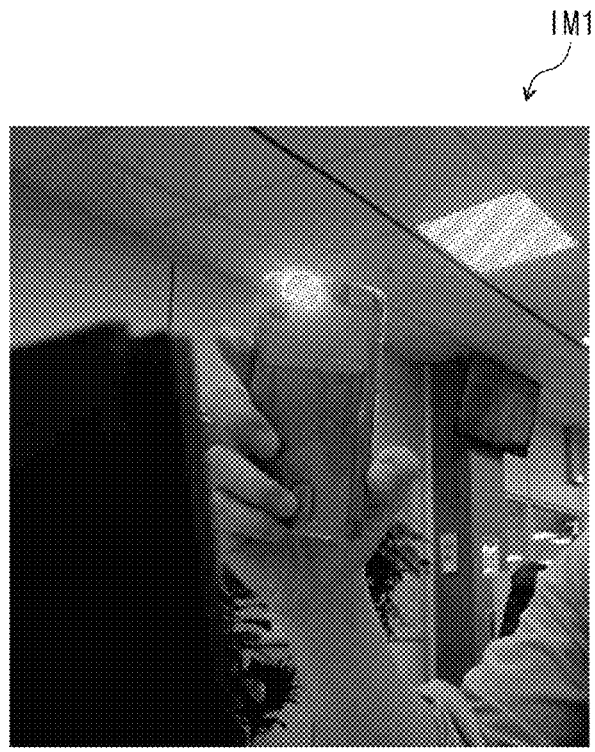
FIG. 8A, FIG. 8B, FIG. 8C, and FIG. 8D are views illustrating images, according to various embodiments of the present disclosure.

The method (S100) for generating training data may include obtaining a first image IM1 (S110), as seen in FIG. 8A. The first image IM1 is a general image generated through the light that does not pass through the display panel DP (see to FIG. 2). In other words, the first image IM1 is an image captured when the display panel DP (see FIG. 2) is absent. The first image IM1 illustrated in FIG. 8A is an image before an artificial light source AFL (see FIG. 8B) is added, and a part corresponding to the artificial light source AFL is hatched for the purpose of understanding.

The method (S100) for generating training data may include generating a second image IM2 (see FIG. 8B) by performing image pre-processing with respect to the first image IM1 (S120). For example, the image pre-processing may include a linearization process.

Figure 8B:
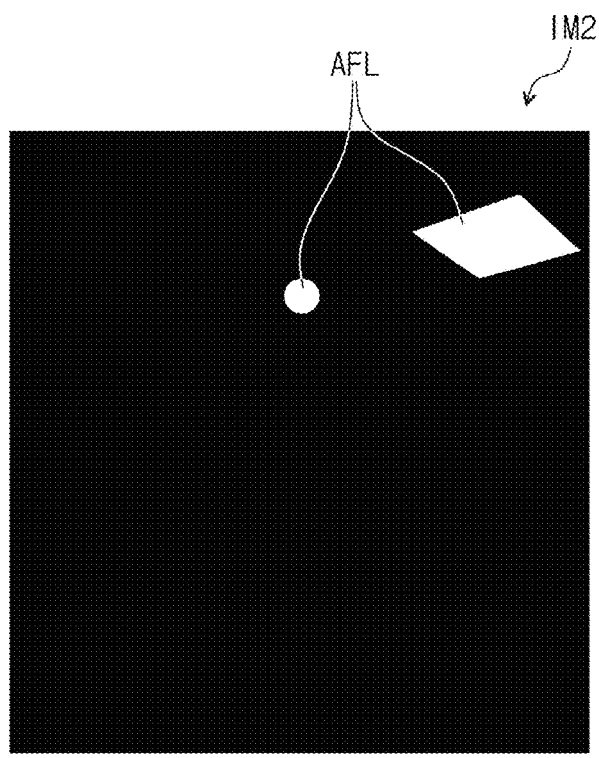

The method (S100) for generating training data may include generating a third image by adding the artificial light source AFL to the second image IM2 (S130), as seen in FIG. 8B. Although the artificial light source AFL illustrated in FIG. 8B is an additionally synthesized light source that was also positioned in a same place in the first image IM1, by way of example, the present disclosure is not limited thereto. The artificial light source AFL does not need to be associated with the first image IM1. Because various training data is provided to correspond to various environments in the artificial neural network, the artificial light source AFL may be provided in the various forms. For example, the artificial light source AFL may be provided in various sizes, positions, numbers, and/or intensities of artificial light sources AFL.

Figure 8C:
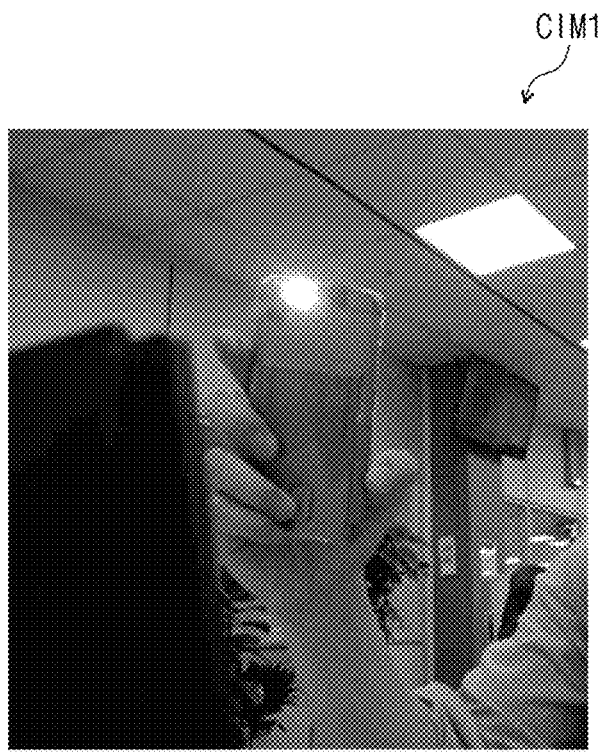

The method (S100) for generating the training data may include generating the first comparison image CIM1 by performing a clipping process and a gamma process to the third image (S140), as shown in FIG. 8C. The clipping process may refer to a process of transforming pixels having brightness that is greater than a corresponding threshold value, for example, a process of transforming the brightness of the pixels into a set value. The first comparison image CIM1 is a target image (hereinafter, referred to as a target restoration image) for restoration, and may be an image synthesized with the artificial light source AFL.

The method (S100) for generating the training data may include generating a fourth image by performing a space-variant convolution operation to the third image (S150). For example, the training data generator may perform the space-variant convolution operation with respect to the third image by using a space-variant point spread function.

A point spread function corresponds to light distribution showing how a pixel of an image is diffracted by a display panel DP (see FIG. 2) and the camera module CM (see FIG. 4) under the display panel DP (see FIG. 2). The point spread function may be varied depending on the position of the image due to the distortion characteristic of the lens of the camera module CM (see FIG. 4). A space-variant point spread function may be defined based on the aspect that the spread function is varied depending on the position of the image due to the distortion characteristic of the lens of the camera module CM.

To calculate the space-variant point spread function, the point spread function for each wavelength may be calculated. In this case, the point spread function for each wavelength may be calculated by considering the characteristic of the display panel DP (see FIG. 2) and the characteristic of the camera module CM (see FIG. 4). For example, a wiring pattern, an electrode pattern, and a black matrix pattern included in the display panel DP (see FIG. 2) may be considered. A pixel distance and a resolution of the camera module CM (see FIG. 4) may be considered as the camera characteristic.

Point spread functions may be combined with respect to all wavelengths, based on the point spread function for each wavelength. In this case, the spectrum of the light source for each wavelength and the spectrum reaction of the camera module CM (see FIG. 4) for each wavelength may be considered. Thereafter, the space-variant point spread function may be derived by reflecting the distortion characteristic of the camera lens on the point spread functions for all wavelengths. An image caused by light passing through the display panel DP (see FIG. 2) may be generated by performing the space-variant point spread function for the general image.

The method (S100) for generating the training data may include generating a fifth image by applying another characteristic to the fourth image (S160). For example, "applying another characteristic" may be directed to transforming an image by components included in the display panel DP (see FIG. 2). For example, the training data generator may generate the fifth image by applying a transmissive spectrum characteristic of a polyimide layer to the fourth image.

Figure 8D:
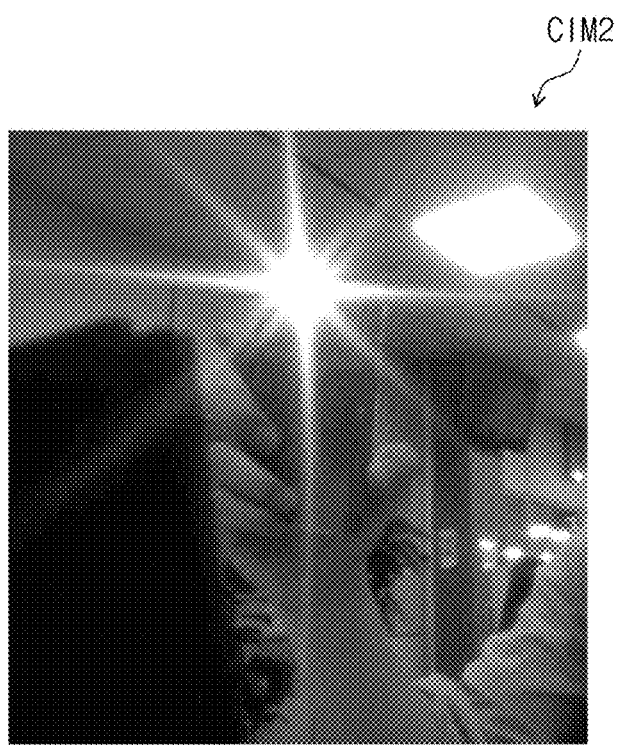

The method (S100) for generating the training data may include generating the second comparison image CIM2 by performing a clipping process and a gamma process to the fifth image (S170), as shown in FIG. 8D. The method (S100) for generating the training data may include providing the first comparison image CIM1 and the second comparison image CIM2, which serves as training data, to the artificial neural network (S180).

The second comparison image CIM2 may be a composite image or a simulation image corresponding to an image generated by light passing through the display panel DP (see FIG. 2). The second comparison image CIM2 may be an image in which image information is not lost due to saturation. The artificial neural network may learn an algorithm for restoring the quality of a damaged image by the display panel DP (see FIG. 2), based on the first comparison image CIM1 and the second comparison image CIM2.

Figure 10A:
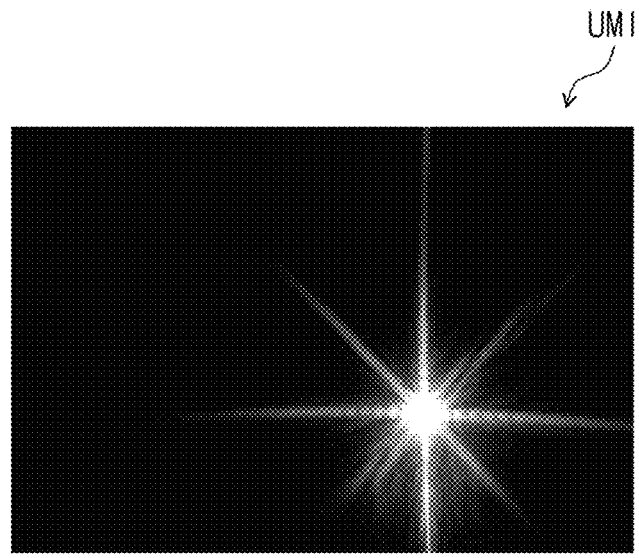
FIG. 10A and FIG. 10B are views illustrating images, according to various embodiments of the present disclosure.
Figure 10B:
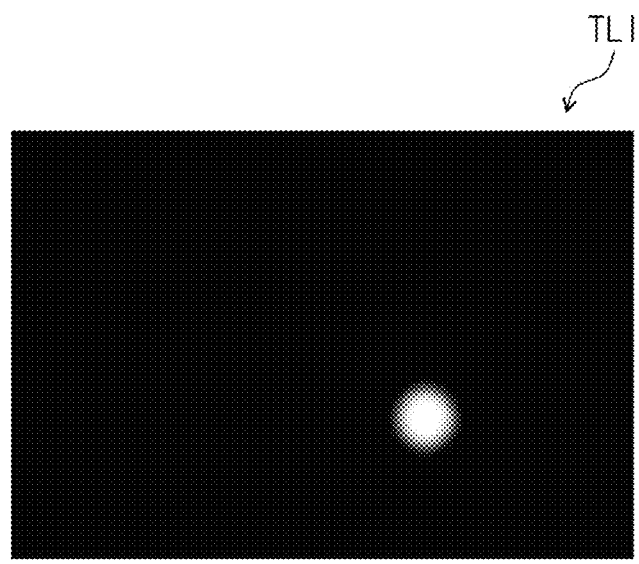
Figure 12A:
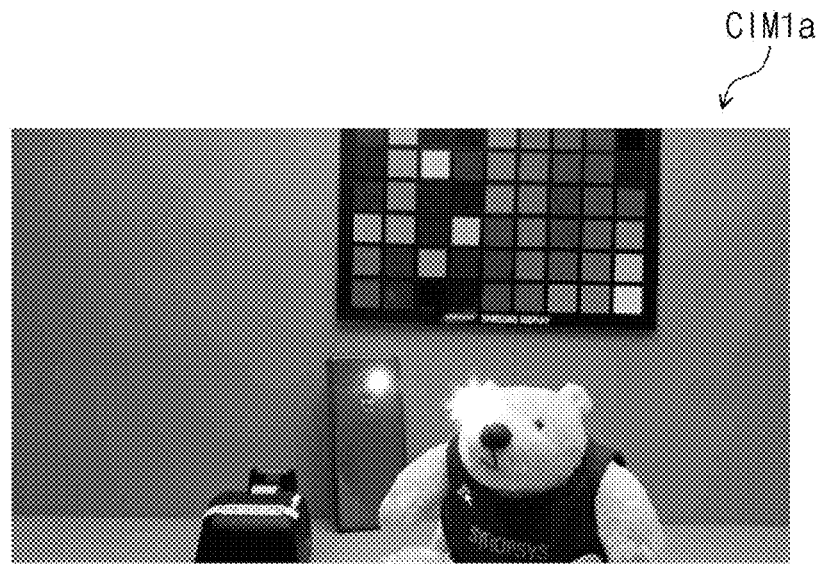
FIG. 12A and FIG. 12B are views illustrating images, according to various embodiments of the present disclosure.
Figure 12B:
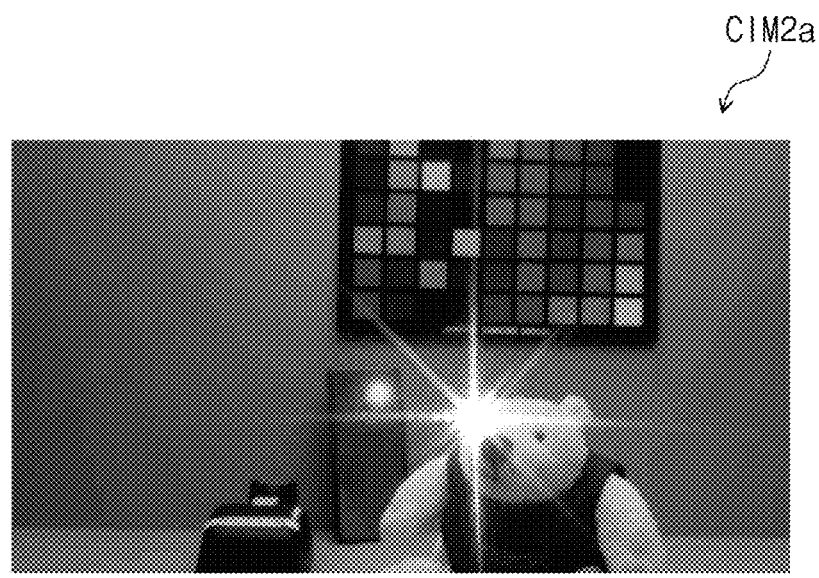

FIG. 9 is a flowchart of a method for generating training data for training an artificial neural network, according to some embodiments of the present disclosure. FIG. 10A and FIG. 10B are views illustrating images, according to some embodiments of the present disclosure. FIG. 11 is a flowchart of a method for generating training data for training an artificial neural network, according to some embodiments of the present disclosure. FIG. 12A and FIG. 12B are views illustrating images, according to some embodiments of the present disclosure.

Referring to FIGS. 9, 10A, and 10B, a method (S200) for generating training data may include obtaining the first measured image UMI (S210), obtaining a second measured image by binarizing the first measured image UMI (S220), estimating the position, size and shape of the light source of the second measured image (S230), generating a target light source having a corresponding profile (S240), and generating a target light source image TLI based on the target light source (S250).

The first measured image UMI and a target light source image TLI may be used to generate a first comparison image CIM1a (see FIG. 12A) and a second comparison image CIM2a (see FIG. 12B).

Referring to FIGS. 11, 12A, and 12B, a method (S300) for generating training data includes obtaining a first image (S310). The first image may correspond to the first image described above with reference to FIGS. 7 and 8A. In other words, the first image refers to an image generated by light that does not pass through the display panel DP (see FIG. 2).

The method (S300) for generating the training data may include generating a second image by performing pre-processing with respect to the first image (S320), and generating the first comparison image CIM1a by compositing the second image with the target light source image TLI (see FIG. 10B) (S330). The first comparison image CIM1a may be referred to as a target restoration image.

The method (S300) for generating the training data may include generating a third image by performing the space-variant convolution operation with respect to the second image (S340). For example, the training data generator may perform the space-variant convolution operation with respect to the second image by using a space-variant point spread function. In other words, the training data generator may generate the third image, wherein the quality of the image is deteriorated, by performing computational processing with respect to the second image. The third image may be a processed image formed based on light that does not pass through the display panel DP (see FIG. 2).

The method (S300) for generating the training data may include generating the second comparison image CIM2a by compositing the third image with the first measured image UMI (S350). The second comparison image CIM2a may be provided by compositing the third image processed through simulation and the first measured image UMI that is actually captured. A diffraction pattern generated through a strong light source may not be generated by computational processing. Accordingly, for an image that is difficult to simulate, the second comparison image CIM2a, which corresponds to the image generated through light passing through the display panel DP (see FIG. 2), may be generated by using the measured image.

The method (S300) for generating the training data may include providing the first comparison image CIM1a and the second comparison image CIM2a, which serve as training data, to the artificial neural network (S360). The first comparison image CIM1a may be referred to as a target restoration image, and may be a composite image obtained through the composition with the target light source image TLI. The second comparison image CIM2a may be referred to as a composite under panel camera (UPC) image, and the second comparison image CIM2a may be an image obtained through the composition with the first measured image UMI.

Figure 13A:
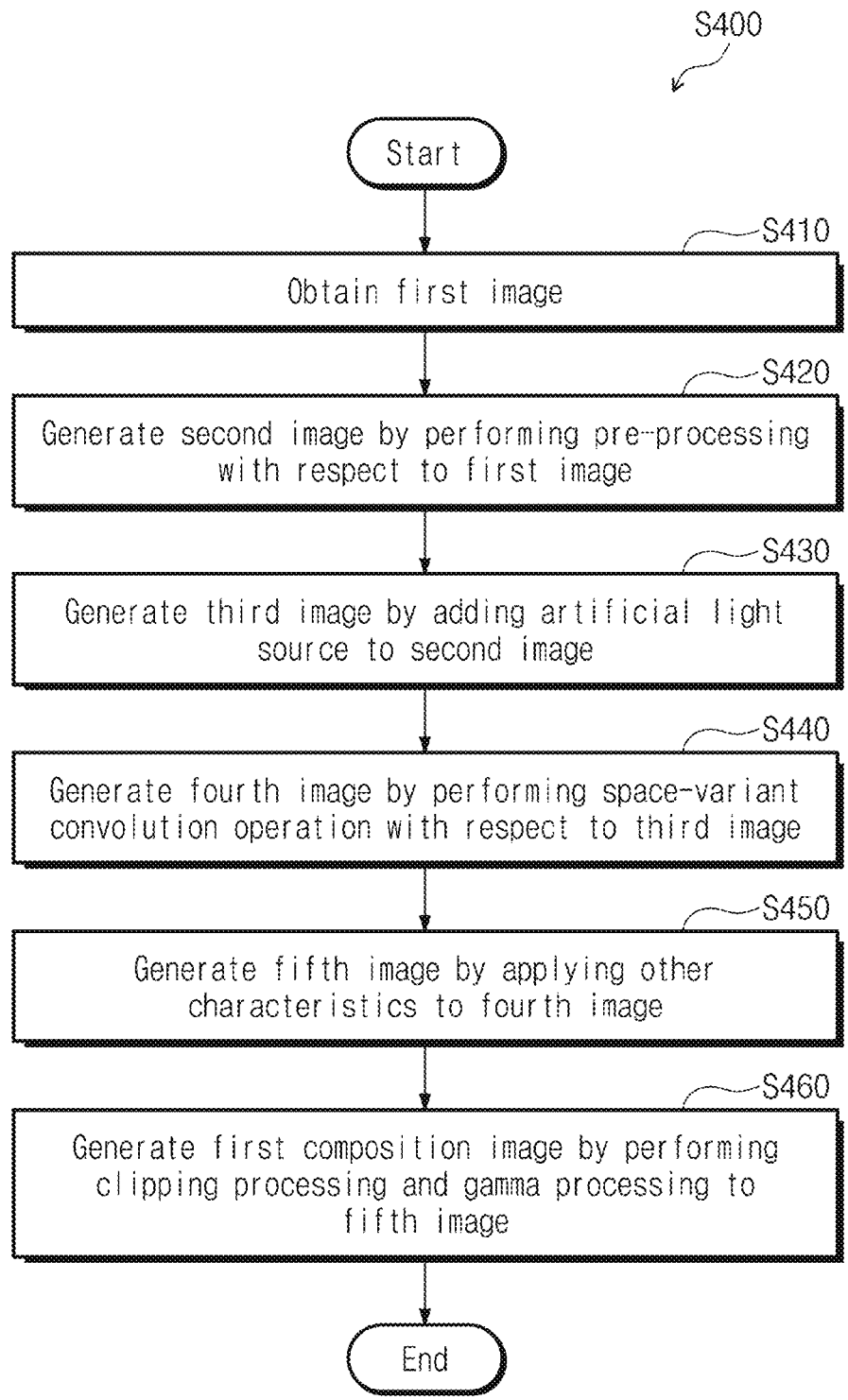
FIG. 13A, FIG. 13B, and FIG. 13C are flowcharts of methods for generating data for training an artificial neural network, according to various embodiments of the present disclosure.
Figure 13B:
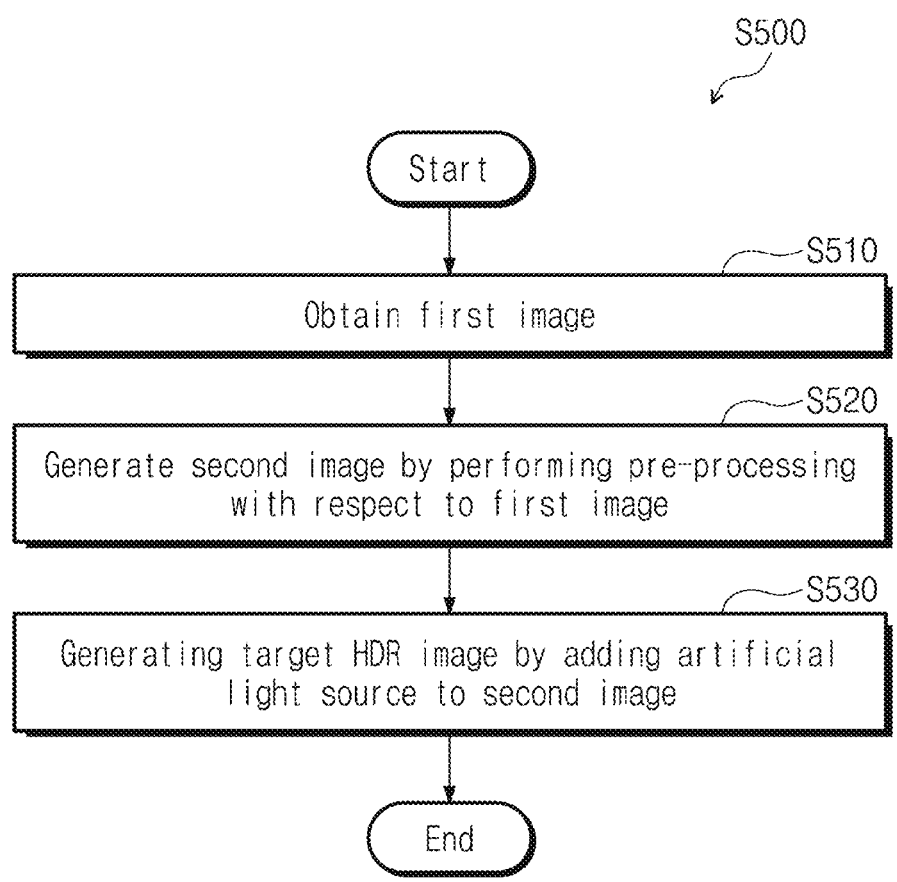
Figure 13C:
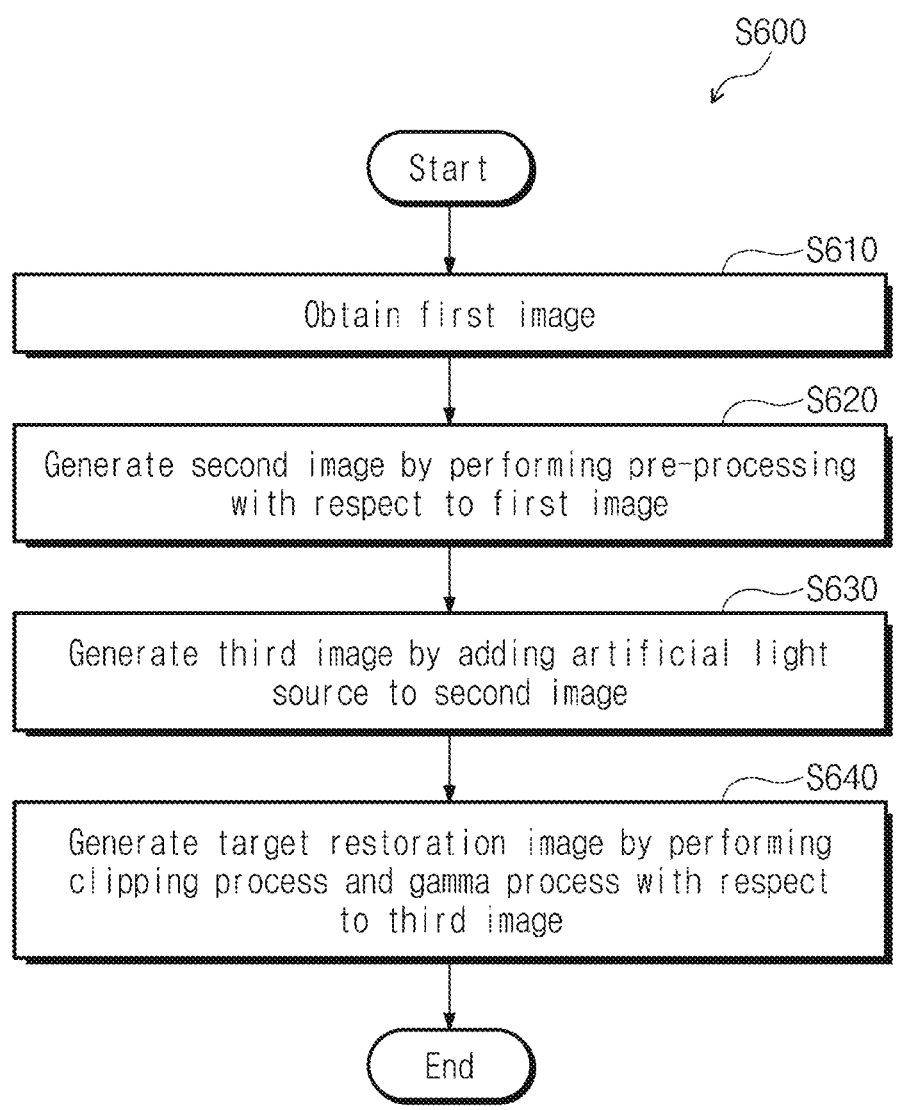
Figure 14:
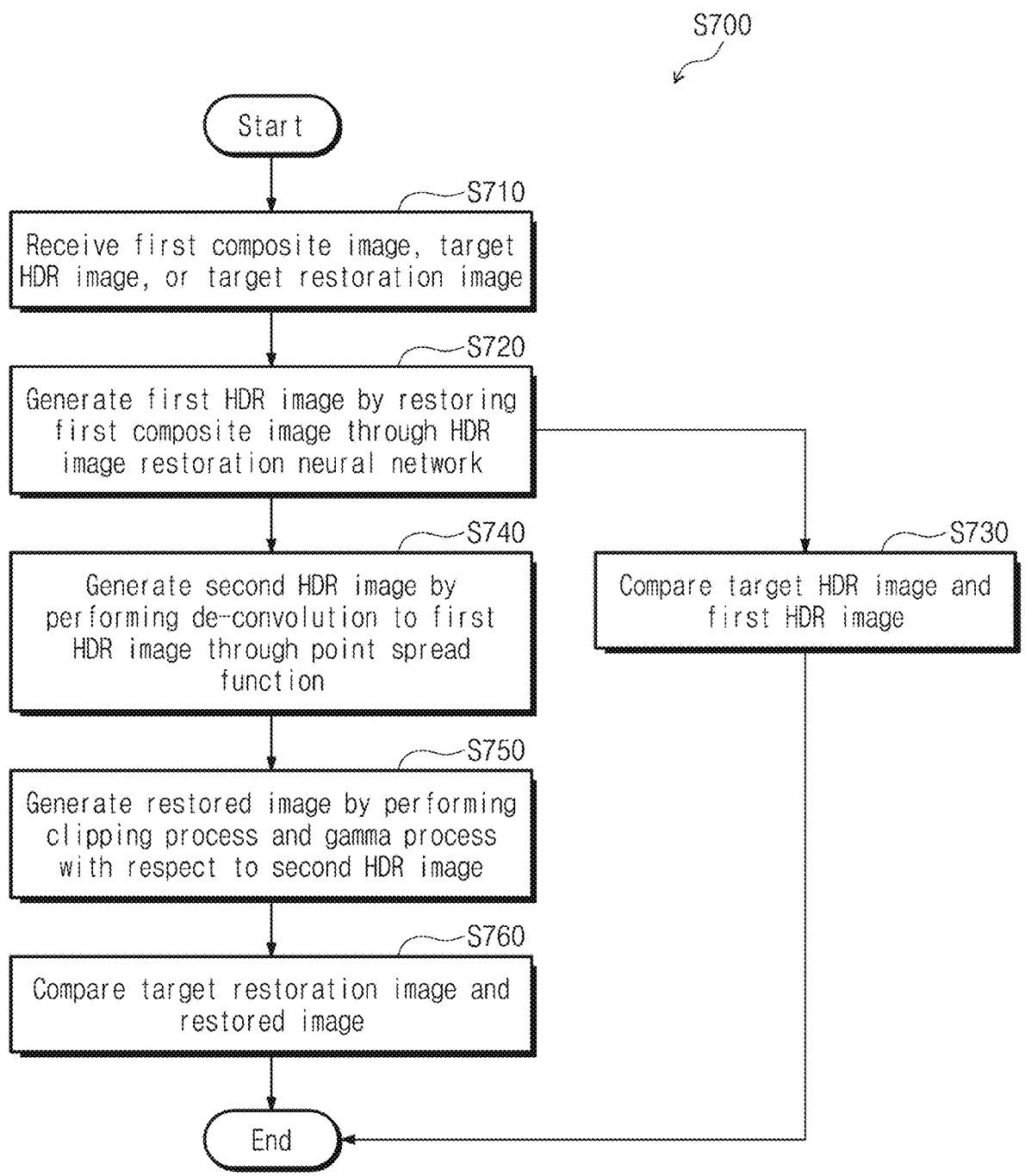
FIG. 14 is a flowchart of a method for training an artificial neural network using training data, according to various embodiments of the present disclosure.

FIGS. 13A, 13B, and 13C are flowcharts of methods for generating training data for training an artificial neural network, according to some embodiments of the present disclosure. FIG. 14 is a flowchart of a method for training an artificial neural network using training data, according to some embodiments of the present disclosure.

Referring to FIG. 13A, a method (S400) for generating training data may include obtaining a first image (S410), generating a second image by performing pre-processing with respect to the first image (S420), generating a third image by adding an artificial light source to the second image (S430), generating a fourth image by performing a space-variant convolution operation with respect to the third image (S440), generating a fifth image by applying another characteristic to the fourth image (S450), and generating a first composite image by performing clipping processing and gamma processing to the fifth image (S460). The first composite image may be used to generate an image for training the artificial neural network. The first composite image may be referred to as a second comparison image.

In some embodiments, the first composite image may be generated using the first measured image as described with reference to FIGS. 9 and 11.

Referring to FIG. 13B, a method (S500) for generating the training data may include obtaining a first image (S510), generating a second image by performing pre-processing with respect to the first image (S520), and generating a target high dynamic range (HDR) image by adding an artificial light source to the second image (S530). The target HDR image corresponds to an image that is not clipped and has no saturated regions. The target HDR image may be referred to as a first comparison image, and may be provided as training data for training the artificial neural network.

in some embodiments, the target HDR image may be generated using the target light source image as described with reference to FIGS. 9 and 11.

Referring to FIG. 13C, a method (S600) for generating the training data may include obtaining a first image (S610), generating a second image by performing pre-processing with respect to the first image (S620), generating a third image by adding an artificial light source to the second image (S630), and generating a target restoration image by performing a clipping process and a gamma process with respect to the third image (S640). The target restoration image may be referred to as a third comparison image, and may be provided as training data for training the artificial neural network.

In some embodiments, the target restoration image may be generated using the target light source image as described with reference to FIGS. 9 and 11.

Referring to FIG. 14, a method (S700) for training an artificial neural network may include receiving a first composite image, a target HDR image, or a target restoration image (S710), and generating a first HDR image by restoring the first composite image through an target HDR image restoration neural network (S720). The first HDR image may be referred to as a second comparison image.

The method (S700) for training an artificial neural network may include comparing the target HDR image (or referred to as a "first comparison image") and a first HDR image (or referred to as a "second comparison image") (S730). The artificial neural network may be additionally trained based on the difference between the target HDR image and the first HDR image.

The method (S700) for training the artificial neural network may include generating a second HDR image by performing deconvolution to the first HDR image through the point spread function (S740) and generating a restored image by performing a clipping process and a gamma process with respect to the second HDR image (S750). The restored image may be referred to as a fourth comparison image.

The method (S700) for training an artificial neural network may include comparing the target restoration image (or referred to as a "third comparison image") and the restored image (or referred to as a "fourth comparison image") (S760). The artificial neural network may be additionally trained based on the difference between the target restoration image and the restored image.

Figure 15:
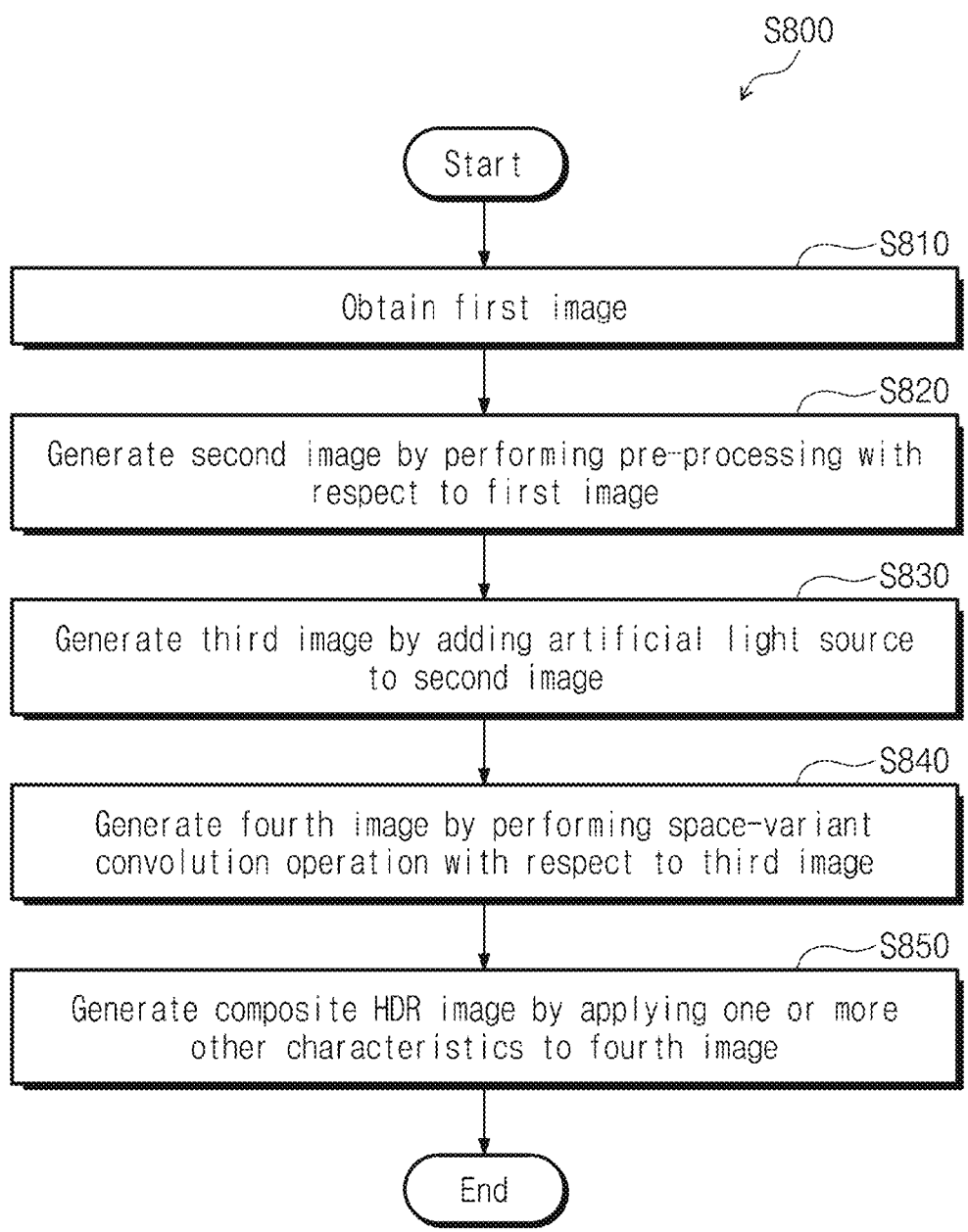
FIG. 15 is a flowchart of a method for generating data for training an artificial neural network, according to various embodiments of the present disclosure.
Figure 16:
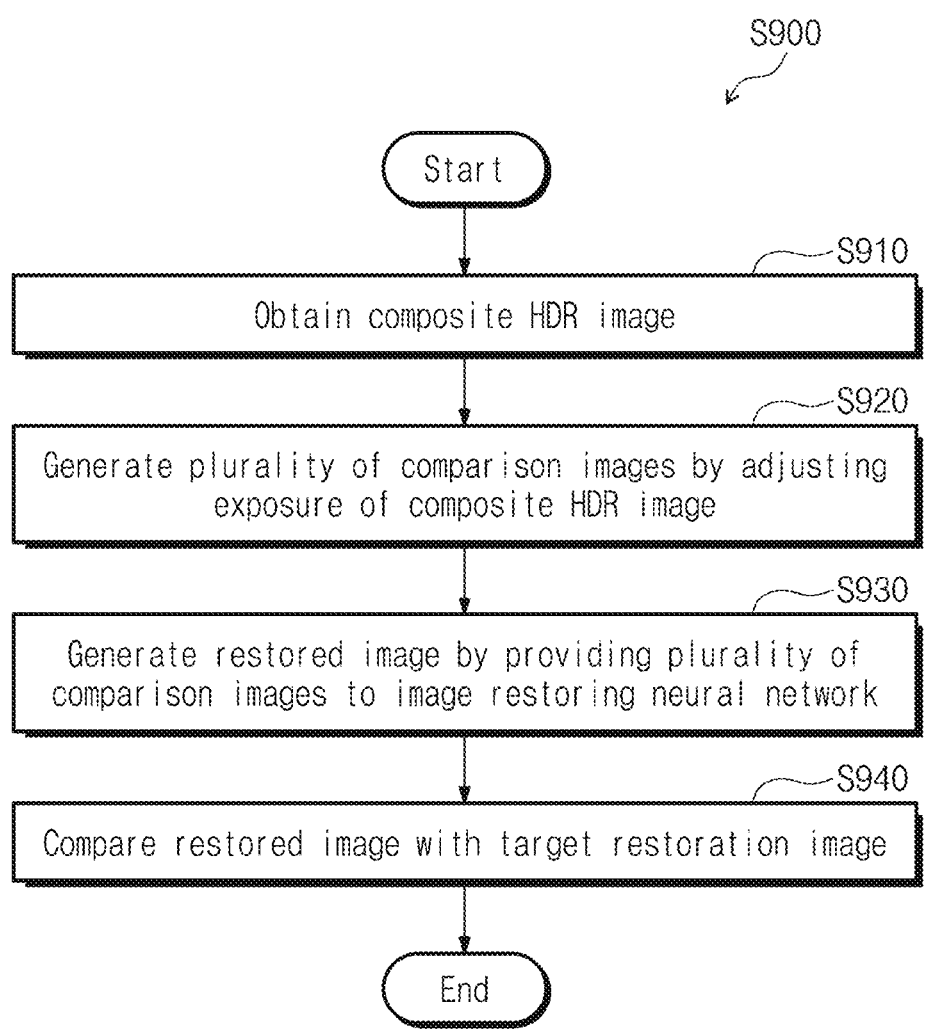
FIG. 16 is a flowchart of a method for training an artificial neural network using training data, according to various embodiments of the present disclosure.

FIG. 15 is a flowchart of a method for generating training data for training an artificial neural network, according to some embodiments of the present disclosure. FIG. 16 is a flowchart of a method for training an artificial neural network using training data, according to some embodiments of the present disclosure.

Referring to FIG. 15, a method (S800) for generating training data may include obtaining a first image (S810), generating a second image by performing pre-processing with respect to the first image (S820), generating a third image by adding an artificial light source to the second image (S830), generating a fourth image by performing a space-variant convolution operation with respect to the third image (S840), and generating a composite HDR image by applying one or more other characteristics to the fourth image (S850).

The composite HDR image corresponds to an image that is not clipped and has no saturated regions. The composite HDR image may be referred to as the second comparison image, and may be provided as training data for training the artificial neural network.

In some embodiments, the composite HDR image may be generated using the first measured image as described with reference to FIGS. 9 and 11.

Referring to FIG. 16, a method (S900) for training an artificial neural network may include obtaining a composite HDR image (S910) and generating a plurality of comparison images by adjusting the exposure of the composite HDR image (S920).

The plurality of comparison images may be images having different degrees of exposure. Three comparison images may be generated by adjusting the exposure of the composite HDR image. However, the present disclosure is not limited thereto. The number of comparison images is not limited as long as the number of the comparison images is two or more.

The method (S900) for training the artificial neural network may include generating a restored image by providing the plurality of comparison images to an image restoring neural network (S930) and comparing a restored image with a target restoration image (S940). The target restoration image may be the first comparison image described with reference to FIG. 7, the first comparison image described with reference to FIG. 11, the target HDR image described with reference to FIG. 13B, or the target restoration image described with reference to FIG. 13C. The artificial neural network may be additionally trained based on the difference between the restored image and the target restoration image.

Figure 17:
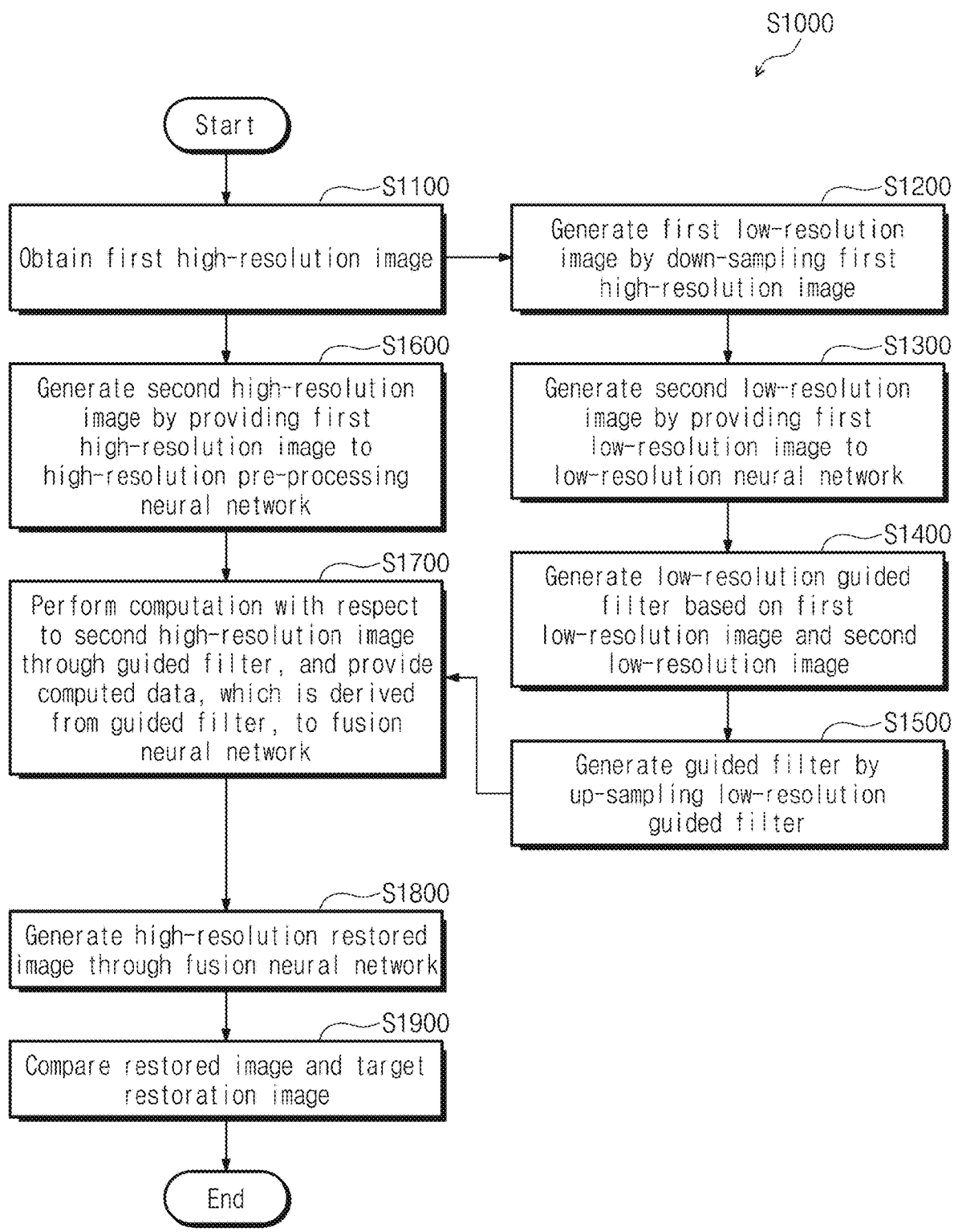
FIG. 17 is a flowchart of a method for training an artificial neural network using training data, according to various embodiments of the present disclosure.

FIG. 17 is a flowchart of a method for training an artificial neural network by using training data, according to some embodiments of the present disclosure.

Referring to FIG. 17, a method (S1000) for training an artificial neural network may include obtaining a first high-resolution image (S1100). The first high-resolution image may be one of the second comparison images described with reference to FIG. 7, the second comparison image described with reference to FIG. 11, the first composite image described with reference to FIG. 13A, or the composite HDR image described with reference to FIG. 15.

The method (S1000) for training the artificial neural network may include generating a first low-resolution image by down-sampling the first high-resolution image (S1200) and generating a second low-resolution image by providing the first low-resolution image to a low-resolution neural network (S1300). The second low-resolution image may be the first low-resolution image that is restored.

The resolution of the first high-resolution image may be about 1024×2048, and the resolution of each of the first low-resolution image and the second low-resolution image may be about 512×1024. According to some embodiments of the present disclosure, a desired second low-resolution image may be obtained through calculation using the first low-resolution image having reduced resolution and a low-resolution neural network. In this case, the amount of computation may be reduced, as compared to directly calculating the restored image using the first high-resolution image and the neural network.

The method (S1000) for training the artificial neural network may include generating a low-resolution guided filter based on the first low-resolution image and the second low-resolution image (S1400) and generating a guided filter by up-sampling the low-resolution guided filter (S1500).

The method (S1000) for training the artificial neural network may include generating a second high-resolution image by providing the first high-resolution image to a high-resolution pre-processing neural network (S1600). The high-resolution pre-processing neural network may be a minimal neural network to perform pre-processing with respect to a high-resolution image. For example, the high-resolution pre-processing neural network, which is a neural network for processing detailed parts, which are not restored through the guided filter, may be a neural network having reduced (e.g., minimum) computation. According to some embodiments, the high-resolution pre-processing neural network may be omitted.

The method (S1000) for training the artificial neural network may include performing computation with respect to the second high-resolution image through the guided filter, and providing computed data, which is derived from the guided filter, to a fusion neural network (S1700) and generating a high-resolution restoration image by using the fusion neural network (S1800). The fusion neural network may output channels of a map to three channels of R, G, and B channels using a single convolution layer having a 1×1 filter size. The artificial neural network to receive an input of the first high-resolution image "$X_h$" and to output the high-resolution restoration image "$Y_h$" may be trained in an end-to-end manner.

The method (S1000) for training the artificial neural network may include comparing the high-resolution restoration image "$Y_h$" and the target restoration image (S1900). The artificial neural network may be additionally trained based on the difference between the high-resolution restoration image and the target restoration image. The target restoration image may be the first comparison image described with reference to FIG. 7, the first comparison image described with reference to FIG. 11, the target HDR image described with reference to FIG. 13B, or the target restoration image described with reference to FIG. 13C.

Figure 18:
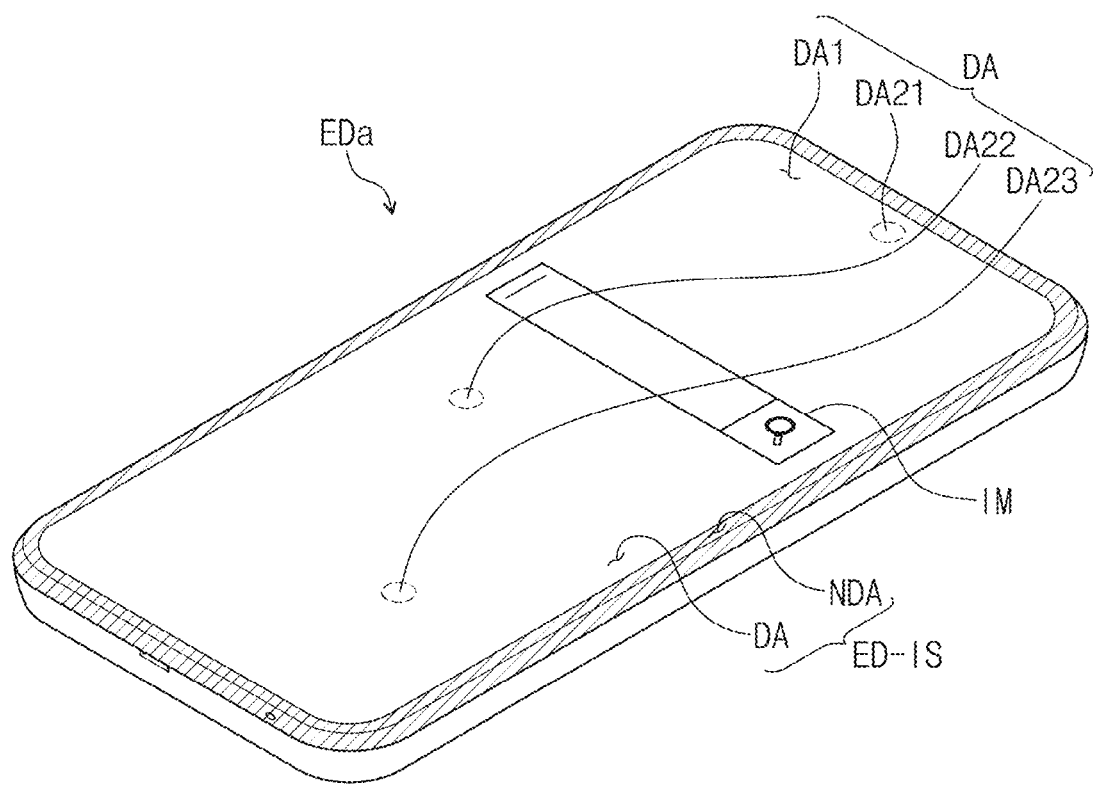
FIG. 18 is a perspective view of an electronic device, according to various embodiments of the present disclosure.

FIG. 18 is a perspective view of an electronic device EDa, according to some embodiments of the present disclosure;

As illustrated in FIG. 18, an electronic device EDa may display an image IM through a display plane ED-IS. The display plane ED-IS includes a display region DA and a non-display region NDA adjacent to the display region DA. The display region DA may include a first display region DA1 and second display regions DA21, DA22, and DA23. The second display regions DA21, DA22, and DA23, which have lower pixel densities or higher transmittances as compared to that of the first display region DA1, are regions that transmit the optical signal. Although FIG. 18 illustrates three second display regions DA21, DA22, and DA23, some embodiments may include a greater number of second display regions or a fewer number of second display regions.

A plurality of camera modules CM (see FIG. 2) may be provided. The number of camera modules CM may be equal to the number of second display regions DA21, DA22, and DA23, or may be fewer than the number of second display regions DA21, DA22, and DA23. The camera modules CM may overlap the second display regions DA21, DA22, and DA23. The image signal obtained by the camera modules CM may be compensated through a compensation algorithm trained by using the first comparison image and the second comparison image.

Figure 19A:
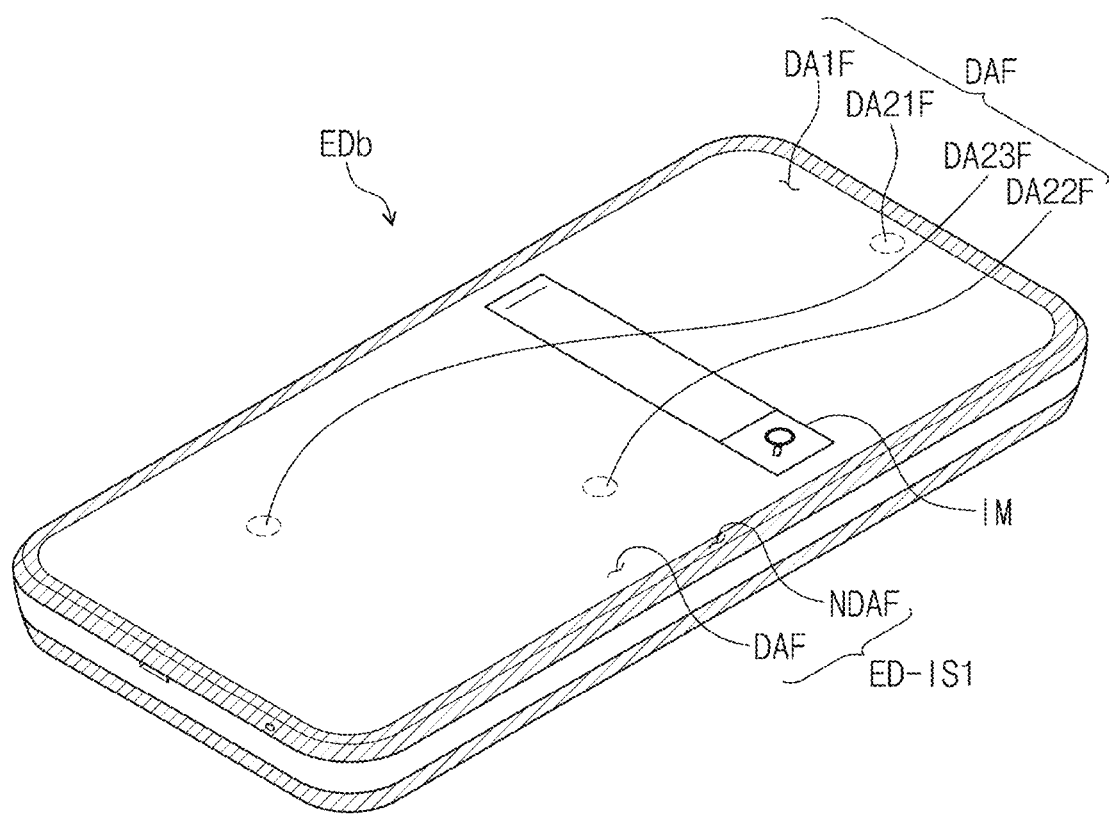
FIG. 19A and FIG. 19B are perspective views of an electronic device according to various embodiments of the present disclosure.
Figure 19B:
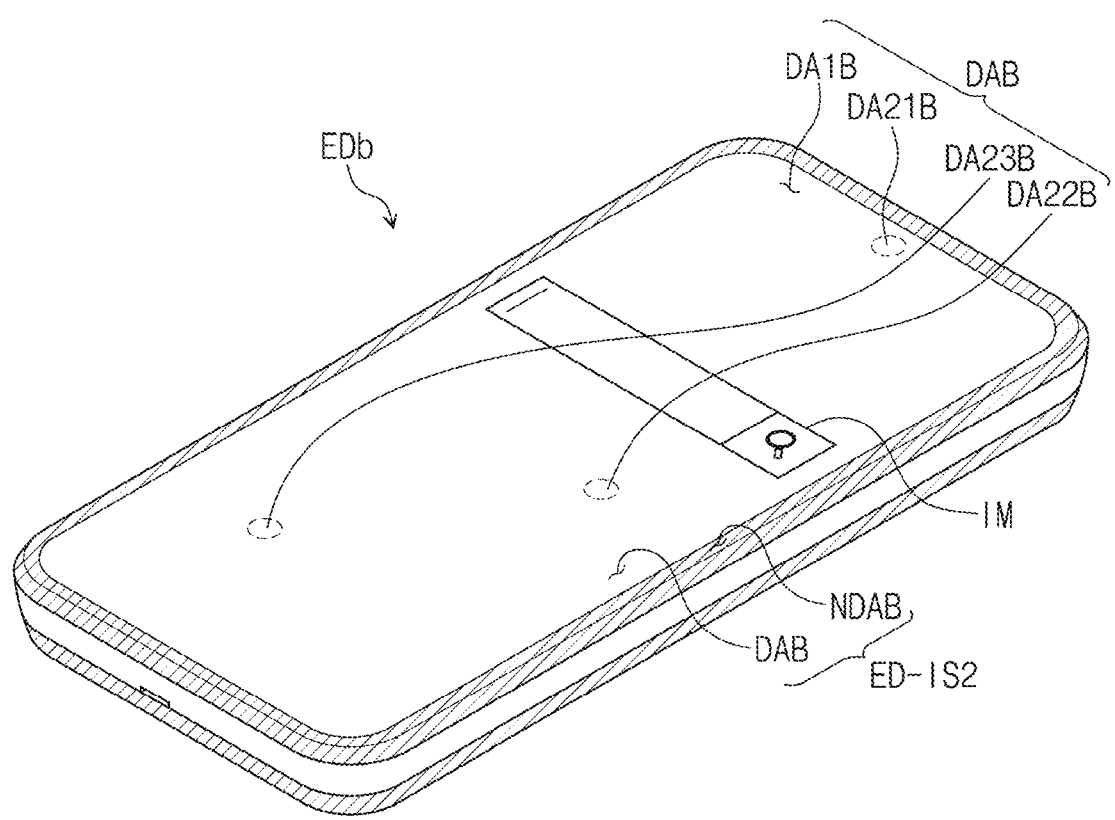

FIG. 19A and FIG. 19B are perspective views of an electronic device EDb, according to some embodiments of the present disclosure.

Referring to FIG. 19A and FIG. 19B, an electronic device EDb may be a double-sided display-type electronic device. The electronic device EDb may display an image IM through a first display plane ED-IS1 and a second display plane ED-IS2. The first display plane ED-IS1 and the second display plane ED-IS2 may be on opposite sides of the electronic device EDb in the third direction DR3.

The first display plane ED-IS1 includes a display region DAF and a non-display region NDAF adjacent the display region DAF. The display region DAF may include a first display region DA1F and second display regions DA21F, DA22F, and DA23F. The second display regions DA21F, DA22F, and DA23F, which have lower pixel densities or higher transmittances as compared to that of the first display region DA1F, are regions that transmit the optical signal (e.g., light).

The second display plane ED-IS2 includes a display region DAB and a non-display region NDAB adjacent the display region DAB. The display region DAB may include a first display region DA1B and second display regions DA21B, DA22B, and DA23B. The second display regions DA21B, DA22B, and DA23B, which have lower pixel densities or higher transmittances as compared to that of the first display region DA1B, are regions that transmit the optical signal.

Although FIG. 19A illustrates three second display regions DA21F, DA22F, and DA23F, some embodiments may include a greater number of second display regions, or may include a fewer number of second display regions. Although FIG. 19B illustrates three second display regions DA21B, DA22B, and DA23B, some embodiments may include a greater number of second display regions, or may include a fewer number of second display regions.

A plurality of camera modules CM (see FIG. 2) may be provided. The number of camera modules CM may be equal to the number of second display regions DA21F, DA22F, DA23F, DA21B, DA22B, and DA23B or smaller than the number of second display regions DA21F, DA22F, DA23F, DA21B, DA22B, and DA23B. The camera modules CM may overlap the second display regions DA21F, DA22F, DA23F, DA21B, DA22B, and DA23B. The image signal obtained by the camera modules CM may be compensated through a compensation algorithm trained by using the first comparison image and the second comparison image.

As described above, the image generated through light passing through the display panel may be compensated through an artificial neural network trained using a pair of a first comparison image and a second comparison image. The first comparison image may be a target image to be compensated, and the second comparison image may be a composite image obtained by reproducing an image generated through the light passing through the display panel. In some embodiments, the second comparison image may be an image having no information loss. Accordingly, when the artificial intelligent neural network trained by using the first comparison image and the second comparison image is used, the performance of recovering the image in the electronic device may be improved.

Although some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims and their functional equivalents.

What is claimed is:

1. An electronic device comprising:
a display panel comprising a display region to display an image;
a camera module under the display panel, overlapping the display region, and configured to output an image signal; and
a compensator configured to generate a compensated image signal by compensating the image signal through a compensation algorithm,
wherein the compensation algorithm is trained by using a target image and a simulation image that is generated to reproduce an image captured based on light passing through the display panel,
wherein the target image is a composite image synthesized based on a first processed image, for restoration,
wherein the simulation image is generated by compositing a second processed image either with an artificial light source or with a first measured image captured based on the light passing through the display panel,
wherein each of the first processed image and the second processed image is obtained by processing a first image, and
wherein the first image comprises an image generated through light that does not pass through the display panel.

2. A method for driving an electronic device, the method comprising:
receiving light passing through a display panel;
generating an image signal based on the light;
compensating the image signal with a compensation algorithm to generate a compensated image signal, wherein the compensation algorithm is trained with training data comprising a first comparison image and a second comparison image; and displaying, on the display panel, a compensated image based on the compensated image signal,
wherein the first comparison image is a composite image synthesized based on a first processed image, for restoration,
wherein the second comparison image comprises a simulation image reproducing an image that is generated by the light passing through the display panel, the simulation image being generated by compositing a second processed image formed based on light that does not pass through the display panel either with an artificial light source or with a first measured image captured based on the light passing through the display panel, and
wherein each of the first processed image and the second processed image is obtained by processing a first image.

3. The method of claim 2, wherein the training data is generated by:
obtaining the first image;
generating a second image by performing pre-processing with respect to the first image;
generating a third image by adding the artificial light source to the second image; and
generating the first comparison image by performing a clipping process and a gamma process with respect to the third image.

4. The method of claim 3, wherein the training data is generated by:
generating a fourth image by performing a space-variant convolution operation with respect to the third image;
generating a fifth image by applying a characteristic to the fourth image; and
generating the second comparison image by performing the clipping process and the gamma process with respect to the fifth image.

5. The method of claim 4, wherein the first image comprises an image generated through light that does not pass through the display panel.

6. The method of claim 2, wherein the training data is generated by:
obtaining the first image;
generating a second image by performing pre-processing with respect to the first image; and
generating the first comparison image by compositing the second image with a target light source image.

7. The method of claim 6, wherein the training data is generated by:
generating a third image by performing a space-variant convolution operation with respect to the second image; and
generating the second comparison image by compositing the third image with the first measured image.

8. The method of claim 7, wherein the target light source image is generated by:
obtaining a second measured image by binarizing the first measured image;
estimating a position, a size, and a shape of a light source of the second measured image;
generating a target light source by using a profile; and
generating the target light source image based on the target light source.

9. The method of claim 8, wherein the first image comprises an image generated by the light that does not pass through the display panel.

10. The method of claim 2, wherein the compensation algorithm is trained by a training method comprising:

generating a first high dynamic range (HDR) image by restoring the simulation image through an HDR image restoration neural network; and
comparing the first HDR image with the first comparison image.

11. The method of claim 10, wherein the training method further comprises:
generating a second HDR image through deconvolution for the first HDR image using a point spread function;
generating a restored image by performing a first clipping process and a first gamma process with respect to the second HDR image; and
comparing the restored image with a target restoration image,
wherein the target restoration image is generated by performing a second clipping process and a second gamma process with respect to the first comparison image.

12. The method of claim 11, wherein the training data is generated by:
obtaining the first image;
generating a second image by performing pre-processing with respect to the first image; and
generating a third image by adding the artificial light source to the second image,
wherein the first comparison image comprises a target HDR image.

13. The method of claim 12, wherein the training data is further generated by:
generating a fourth image by performing a space-variant convolution operation with respect to the third image;
generating a fifth image by applying another characteristic to the fourth image; and
generating the second comparison image by performing a clipping process and a gamma process with respect to the fifth image.

14. The method of claim 2, wherein the compensation algorithm is trained by a training method further comprising:
generating a plurality of comparison images by adjusting exposure of the second comparison image; and
generating a restored image by providing the plurality of comparison images to an image restoration neural network.

15. The method of claim 14, wherein the training data is generated by:
obtaining the first image;
generating a second image by performing pre-processing with respect to the first image;
generating a third image by adding the artificial light source to the second image;
generating a fourth image by performing a space-variant convolution operation with respect to the third image; and
generating the second comparison image by applying other characteristics to the fourth image, wherein the second comparison image comprises a composite HDR image.

16. The method of claim 2, wherein the compensation algorithm is trained by a training method comprising:
generating a first low-resolution image by down-sampling the second comparison image;
generating a second low-resolution image by providing the first low-resolution image to a low-resolution neural network;
generating a low-resolution guided filter based on the first low-resolution image and the second low-resolution image;

generating a guided filter by up-sampling the low-resolution guided filter; and generating a restored image obtained by restoring the second comparison image using the guided filter.

17. The method of claim 16, wherein the training method further comprises:

generating a high-resolution image by providing the second comparison image to a high-resolution pre-processing neural network;

calculating the high-resolution image using the guided filter and providing calculated data to a fusion neural network; and generating the restored image using the fusion neural network.

18. The method of claim 17, wherein the training method further comprises:

comparing the restored image with the first comparison image.

19. An electronic device comprising:

a display panel comprising a first display region having a first light transmittance, and a second display region having a second light transmittance that is greater than the first light transmittance;

a camera module under the display panel and overlapping the second display region, and configured to output an image signal; and a compensator configured to generate a compensated image signal by compensating the image signal by a compensation algorithm, wherein the compensation algorithm is trained with training data comprising a first comparison image and a second comparison image, wherein the first comparison image is a composite image synthesized based on a first processed image, for restoration, wherein the second comparison image comprises a simulation image reproducing an image that is generated by light passing through the display panel, the simulation image being generated by compositing a second processed image formed based on light that does not pass through the display panel either with an artificial light source or with a first measured image captured based on the light passing through the display panel, and wherein each of the first processed image and the second processed image is obtained by processing a first image.

20. The electronic device of claim 19, wherein the second display region and the camera module are each provided in plurality, wherein the plurality of camera modules overlap the plurality of second display regions in one-to-one correspondence, and wherein image signals output from the plurality of camera modules are compensated by the compensation algorithm.

* * * * *